United States Patent
Endo et al.

(10) Patent No.: US 10,253,125 B2
(45) Date of Patent: Apr. 9, 2019

(54) POLYMERIZABLE LIQUID CRYSTAL COMPOSITION AND OPTICALLY ANISOTROPIC BODY, RETARDATION FILM, AND PATTERNED RETARDATION FILM USING THE SAME

(71) Applicant: DIC CORPORATION, Tokyo (JP)

(72) Inventors: Kouichi Endo, Kita-adachi-gun (JP); Mika Yamamoto, Kita-adachi-gun (JP); Kazuaki Hatsusaka, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/320,979

(22) PCT Filed: Jun. 16, 2015

(86) PCT No.: PCT/JP2015/067272
§ 371 (c)(1),
(2) Date: Dec. 21, 2016

(87) PCT Pub. No.: WO2015/198915
PCT Pub. Date: Dec. 30, 2015

(65) Prior Publication Data
US 2017/0158793 A1   Jun. 8, 2017

(30) Foreign Application Priority Data

Jun. 23, 2014   (JP) ................. 2014-128156

(51) Int. Cl.
| | | |
|---|---|---|
| *C08F 222/20* | (2006.01) | |
| *C08F 20/30* | (2006.01) | |
| *G02B 5/30* | (2006.01) | |
| *C08F 220/68* | (2006.01) | |
| *C09K 19/38* | (2006.01) | |
| *C09K 19/54* | (2006.01) | |
| *C09K 19/58* | (2006.01) | |
| *C08F 220/30* | (2006.01) | |

(52) U.S. Cl.
CPC .......... *C08F 222/20* (2013.01); *C08F 220/30* (2013.01); *C08F 220/68* (2013.01); *C09K 19/3842* (2013.01); *C09K 19/542* (2013.01); *C09K 19/588* (2013.01); *G02B 5/3016* (2013.01); *G02B 5/3083* (2013.01); *C08F 2800/20* (2013.01); *C09K 2019/546* (2013.01)

(58) Field of Classification Search
CPC . C08F 222/20; C09K 19/3842; C09K 19/542; G02B 5/3016; G02B 19/542; G02B 19/3804; G02B 19/3833
USPC ....... 526/286, 310, 318.1, 318.3; 252/299.5; 349/127
See application file for complete search history.

(56) References Cited

FOREIGN PATENT DOCUMENTS

JP   2014-059552 A   *   4/2014   ............. G02B 27/26

OTHER PUBLICATIONS

Online translation of Detailed Description of JP 2014-059992A; publication date: Apr. 2014.*
Organic Electronics & Photonics, SYNTHON Chemicals, 2015, pp. 1-8, 119-121.*
Escuti, et al, "Optical-strain characteristics of anisotropic polymer films fabricated from a liquid crystal diacrylate," Journal of Applied Physics, vol. 95, No. 5, 2386-2390, Mar. 2004.*

* cited by examiner

*Primary Examiner* — Fred M Teskin
(74) *Attorney, Agent, or Firm* — Westerman, Hattori, Daniels & Adrian, LLP

(57) ABSTRACT

There is provided a polymerizable liquid crystal composition that enables a film formed through application of the composition and exposure thereof to heat or active energy rays to have an excellent molecular alignment and reduced haze. There is also provided an optically anisotropic body that is produced by using such a polymerizable liquid crystal composition and that has a good transparency. In particular, the present invention provides a polymerizable liquid crystal composition containing a polymerizable haze-reducing agent and a polymerizable liquid crystal compound. Furthermore, the present invention also provides an optically anisotropic body produced by using the polymerizable liquid crystal composition of the present invention. Using the polymerizable liquid crystal composition of the present invention enables production of an optically anisotropic body having a good transparency; hence, the polymerizable liquid crystal composition is usefully applied to optical materials used in, for example, retardation films.

14 Claims, No Drawings

POLYMERIZABLE LIQUID CRYSTAL COMPOSITION AND OPTICALLY ANISOTROPIC BODY, RETARDATION FILM, AND PATTERNED RETARDATION FILM USING THE SAME

TECHNICAL FIELD

The present invention relates to a polymerizable liquid crystal composition that is useful as a component of an optically anisotropic body used for optical compensation in, for instance, liquid crystal devices, displays, optical components, colorants, security marking, laser-emitting members, or liquid crystal displays. The present invention also relates to an optically anisotropic body, retardation film, patterned retardation film, and brightness-enhancing film produced by using such a composition.

BACKGROUND ART

Polymerizable liquid crystal compositions serve as useful components of optically anisotropic bodies, and optically anisotropic bodies are applied to, for example, polarizing films and retardation films in a variety of liquid crystal displays. Polarizing films and retardation films are produced by applying a polymerizable liquid crystal composition onto a substrate; drying the solvent; aligning the molecules of the polymerizable liquid crystal composition with, for instance, an alignment film; and curing the polymerizable liquid crystal composition in this state through application of heat or irradiation with active energy rays. It is known that using a polymerizable cholesteric liquid crystal composition in which a chiral compound has been added to a polymerizable liquid crystal composition enables production of a circular polarization splitter, and application thereof to a brightness-enhancing film has been studied.

Such polymerizable liquid crystal compositions are generally applied onto glass substrates, plastic substrates, or alignment films optionally formed on these substrates; in the case where the polymerizable liquid crystal compositions are used in the above-mentioned polarizing films, retardation films, or brightness-enhancing films, a film to be formed through heating of the applied composition or irradiation thereof with active energy rays needs to have a transparency. A film formed through application of a polymerizable liquid crystal composition produced by dissolution of a polymerizable liquid crystal compound and a photopolymerization initiator in a solvent, however, causes defective alignment in many cases and therefore has a large haze value, which results in a problem in which only a film having a poor transparency is produced.

A technique for addressing such a problem has been reported, in which a fluorine compound is added to a polymerizable liquid crystal composition to improve molecular alignment and reduce haze; however, transparency is still insufficient (see Patent Literatures 1 and 2).

CITATION LIST

Patent Literature

PTL 1: Japanese Unexamined Patent Application Publication No. 2007-091847
PTL 2: Japanese Unexamined Patent Application Publication No. 2013-071945

SUMMARY OF INVENTION

Technical Problem

It is an object of the present invention to provide a polymerizable liquid crystal composition that enables a film formed through application of the composition and exposure thereof to heat or active energy rays to have a good adhesion to a substrate, excellent molecular alignment, and reduced haze. It is another object of the present invention to provide an optically anisotropic body that is produced by using such a polymerizable liquid crystal composition and that has a good transparency.

Solution to Problem

In order to achieve the above-mentioned objects, a polymerizable liquid crystal composition has been intensively studied, thereby accomplishing the present invention.

In particular, the present invention provides a polymerizable liquid crystal composition containing a polymerizable haze-reducing agent and a polymerizable liquid crystal compound. The present invention also provides an optically anisotropic body using the polymerizable liquid crystal composition of the present invention.

Advantageous Effects of Invention

Using the polymerizable liquid crystal composition of the present invention enables production of an optically anisotropic body having a good transparency; hence, the polymerizable liquid crystal composition is usefully applied to optical materials used in, for example, a retardation films.

DESCRIPTION OF EMBODIMENTS

The best mode of the polymerizable liquid crystal composition of the present invention will now be described. The term "liquid crystal" of the polymerizable liquid crystal composition herein refers to that a polymerizable liquid crystal composition applied to a substrate and then subjected to removal of an organic solvent has liquid crystal properties. The term "liquid crystal" of a polymerizable liquid crystal compound herein refers to that a single polymerizable liquid crystal compound to be used has liquid crystal properties or that a mixture of polymerizable liquid crystal compounds to be used have liquid crystal properties. The polymerizable liquid crystal composition can be polymerized into a polymer (film) by either or both of irradiation with light, such as ultraviolet rays, and application of heat.

(Polymerizable Haze-Reducing Agent)

The polymerizable liquid crystal composition of the present invention contains a polymerizable haze-reducing agent. The haze-reducing agent refers to a compound that serves as follows: in the case where a film formed by curing the polymerizable liquid crystal composition containing it is irradiated with visible light, the compound can make the ratio of diffused and transmitted light to the whole of transmitted light (haze value) smaller as compared with the case where such a compound is not used. Specific examples of the polymerizable haze-reducing agent include compounds each containing at least one polymerizable functional group and at least one polar group selected from —OH, —COOH, —NH$_2$, —NO$_2$, and —SH.

The polymerizable functional group is preferably a group selected from polymerizable functional groups represented by Formulae (P-1) to (P-20).

[Chem. 1]

(P-1) 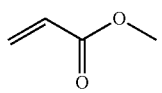
(P-2) 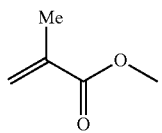
(P-3) 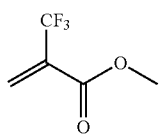
(P-4) 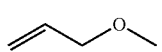
(P-5) 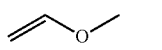
(P-6) 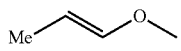
(P-7) 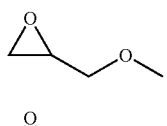
(P-8) 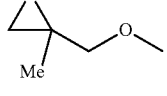
(P-9) 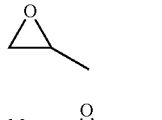
(P-10) 
(P-11) 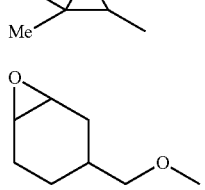
(P-12) 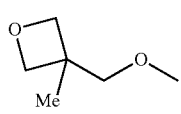
(P-13) 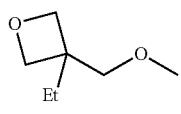
(P-14) 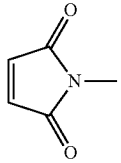
(P-15) 

(P-16) 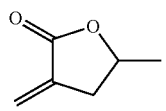
(P-17) 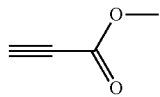
(P-18) 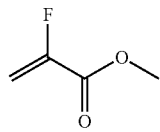
(P-19) 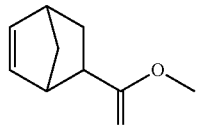
(P-20) 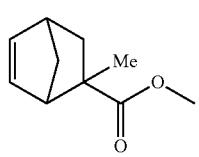

Such polymerizable functional groups are subjected to polymerization through radical polymerization, radical addition polymerization, cationic polymerization, or anionic polymerization. In particular, in the case where the polymerization involves exposure to ultraviolet, the groups represented by Formulae (P-1), (P-2), (P-3), (P-4), (P-5), (P-7), (P-11), (P-13), (P-15), and (P-18) are preferred; the groups represented by Formulae (P-1), (P-2), (P-3), (P-7), (P-11), and (P-13) are more preferred; the groups represented by Formulae (P-1), (P-2), and (P-3) are further preferred; and the groups represented by Formulae (P-1) and (P-2) are especially preferred. The number of the polymerizable functional groups in the polymerizable haze-reducing agent is preferably one, two, or three; more preferably one or two; and especially preferably one.

The polymerizable haze-reducing agent is a compound containing at least one polar group selected from —OH, —COOH, —NH$_2$, —NO$_2$, and —SH. Use of such a compound containing a polar group is preferred because it enables haze to be reduced. In particular, the polymerizable haze-reducing agent preferably contains at least one group selected from —OH, —COOH, —NH$_2$, and —NO$_2$; more preferably at least one group selected from —OH and —COOH; and especially preferably at least one —OH group.

The polymerizable haze-reducing agent is preferably a compound (I) having one or more divalent alicyclic hydrocarbon groups or aromatic hydrocarbon groups in terms of an enhancement in adhesion to a substrate.

In particular, the compound (I) is preferably at least one compound selected from the group consisting of compounds represented by General Formula (I-1).

[Chem. 2]

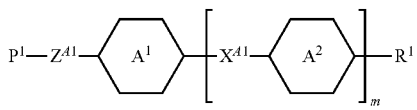

(I-1)

(in the formula, $P^1$ represents a polymerizable functional group, which is preferably a group selected from the above-mentioned groups represented by Formulae (P-1) to (P-20), and is subjected to polymerization through radical polymerization, radical addition polymerization, cationic polymerization, or anionic polymerization. In particular, in the case where the polymerization involves exposure to ultraviolet, the groups represented by Formulae (P-1), (P-2), (P-3), (P-4), (P-5), (P-7), (P-11), (P-13), (P-15), and (P-18) are preferred; the groups represented by Formulae (P-1), (P-2), (P-3), (P-7), (P-11), and (P-13) are more preferred; the groups represented by Formulae (P-1), (P-2), and (P-3) are further preferred; and the groups represented by Formulae (P-1) and (P-2) are especially preferred.

$Z^{41}$ represents an alkylene group having 1 to 16 carbon atoms, and the alkylene group may be linear or branched. In the alkylene group, one or more $CH_2$ groups are each independently optionally substituted with —O—, —S—, —NH—, —N($CH_3$)—, —CO—, —COO—, —OCO—, —OCOO—, —SCO—, —COS—, —CH=CH—, or —C≡C— such that oxygen atoms, sulfur atoms, and an oxygen atom and sulfur atom are not directly bonded to each other; and at least one hydrogen atom is optionally substituted with a group selected from —OH, —COOH, —$NH_2$, —$NO_2$, and —SH. The alkylene group having 1 to 16 carbon atoms are preferably a linear alkylene group, more preferably a linear alkylene group having 1 to 8 carbon atoms, and especially preferably a linear alkylene group having 1 to 6 carbon atoms. In the case where one $CH_2$ group or two or more $CH_2$ groups not adjoining each other in the alkylene group are substituted, it is preferred that they be substituted with —O—, —CO—, —COO—, —OCO—, or —OCOO—; in the case where only one $CH_2$ group in the alkylene group is substituted, it is especially preferred that the terminal $CH_2$ group bonded to the ring $A^1$ be substituted with —O— or —CO—.

The rings $A^1$ and $A^2$ each independently represent a 1,4-phenylene group or a 1,4-cyclohexylene group and are optionally unsubstituted or substituted with at least one substituent L. In the case where $A^2$ is multiple, the multiple rings may be the same as or different from each other.

The substituent L is a fluorine atom, a chlorine atom, a bromine atom, an iodine atom, a pentafluoro sulphuranyl group, a cyano group, an amino group, a hydroxyl group, a mercapto group, a methylamino group, a dimethylamino group, a diethylamino group, a diisopropylamino group, a trimethylsilyl group, or a dimethylsilyl group. In terms of orientation, the rings $A^1$ and $A^2$ are preferably unsubstituted or substituted with the substituent L that is a fluorine atom or a chlorine atom, and especially preferably unsubstituted.

$X^{41}$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—, —CH=CH—COO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —CH—OCO—, —CH=CH—, —N=N—, —CH=N—N=CH—, —CF=CF—, —C≡C—, or a single bond. It is preferably —O—, —$OCH_2$—, —$CH_2O$—, —$CH_2CH_2$—, —COO—, —OCO—, —COO—$CH_2CH_2$—, —OCO—$CH_2CH_2$—, —$CH_2CH_2$—COO—, —$CH_2CH_2$—OCO—, —C≡C—, or a single bond; and especially preferably —COO—, —OCO—, or a single bond in view of compatibility with the polymerizable liquid crystal compound. In the case where $X^{41}$ is multiple, they may be the same as or different from each other.

m represents 0, 1, or 2. In order to form a film having a further reduced haze through application of the polymerizable liquid crystal composition of the present invention and heating thereof or irradiation thereof with active energy rays, m is preferably 0 or 1, especially preferably 0, and appropriately determined on the basis of the intended physical properties.

$R^1$ represents a hydrogen atom, an OH group, a COOH group, an $NH_2$ group, an $NO_2$ group, an SH group, or linear or branched alkyl group having 1 to 20 carbon atoms; in the alkyl group, at least one hydrogen atom is optionally substituted with a group selected from —OH, —COOH, —$NH_2$, —$NO_2$, or —SH;

in the alkyl group, one or more $CH_2$ groups are each independently optionally substituted with —O—, —S—, —NH—, —N($CH_3$)—, —CO—, —COO—, —OCO—, —OCOO—, —SCO—, —COS—, —CH=CH—, or —C≡C— provided that oxygen atoms, sulfur atoms, and an oxygen atom and sulfur atom are not directly bonded to each other;

$R^1$ preferably represents a hydrogen atom or a linear or branched alkyl group having 1 to 8 carbon atoms in terms of orientation; in the alkyl group, at least one hydrogen atom is optionally substituted with a group selected from —OH, —COOH, —$NH_2$, —$NO_2$, and —SH, and one or more $CH_2$ groups are each independently optionally substituted with —O—, —COO—, —OCO—, or —O—CO—O—;

$R^1$ especially preferably represents a hydrogen atom or a linear or branched alkyl group having 1 to 5 carbon atoms; in the alkyl group, at least one hydrogen atom is optionally substituted with a group selected from —OH, —COOH, —$NH_2$, —$NO_2$, and —SH, and one or more $CH_2$ groups are each independently optionally substituted with —O—, —COO—, —OCO—, or —O—CO—O—; and the alkyl group in which at least one hydrogen atom has been substituted with a group selected from —OH, —COOH, —$NH_2$, —$NO_2$, and —SH is especially preferably a linear alkyl group having a terminal group substituted with a group selected from —OH, —COOH, —$NH_2$, —$NO_2$, and —SH.

In the compound represented by General Formula (I-1), $Z^{41}$ and/or $R^1$ are at least one group selected from —OH, —COOH, —$NH_2$, —$NO_2$, and —SH or have a group selected from —OH, —COOH, —$NH_2$, —$NO_2$, and —SH)

Use of the polymerizable compound having at least one divalent alicyclic hydrocarbon group or aromatic hydrocarbon group and at least one group selected from —OH, —COOH, —$NH_2$, —$NO_2$, and —SH has the following effects: an optically anisotropic body made of a film formed through application of the polymerizable liquid crystal composition of the present invention and heating thereof or irradiation thereof with energy rays has an excellent adhesion to a substrate, enables a polymer to have a good orientation, and reduces haze with good transparency being produced.

In the case where the polymerizable haze-reducing agent that is used in the present invention to enhance orientation has a large weight average molecular weight (Mw), the compatibility thereof with the polymerizable liquid crystal compound may be reduced; hence, it preferably has Mw of not more than 500, more preferably Mw of not more than 400, and especially preferably Mw of not more than 300. In addition, the molecular weight distribution (Mw/Mn) that is the ratio of weight average molecular weight (Mw) to number average molecular weight (Mn) is preferably in the range of 1.05 to 3.00. The weight average molecular weight (Mw) and the number average molecular weight (Mn) is measured by GPC (gel permeation chromatography) in terms of polystyrene.

In particular, the compound represented by General Formula (I-1) is preferably any of compounds represented by General Formulae (I-2) and (I-3).

At least one compound selected from the group consisting of compounds represented by General Formula (I-2) is preferred.

[Chem. 3]

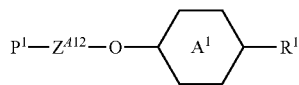

(I-2)

(in the formula, $P^1$, $A^1$, and $R^1$ have the same definitions as those in General Formula (I-1); $Z^{412}$ represents an alkylene group that has 1 to 15 carbon atoms and that may be linear or branched; one or more $CH_2$ groups in the alkylene group are each independently optionally substituted with —O—, —S—, —NH—, —N($CH_3$)—, —CO—, —COO—, —OCO—, —OCOO—, —SCO—, —COS—, —CH═CH—, or —C≡C— such that oxygen atoms, sulfur atoms, and an oxygen atom and sulfur atom are not directly bonded to each other; and at least one hydrogen atom in the alkylene group is substituted with a group selected from —OH, —COOH, —$NH_2$, —$NO_2$, and —SH)

In particular, $P^1$ is preferably any of the groups represented by Formula (P-1) and (P-2). The ring $A^1$ represents a 1,4-phenylene group or a 1,4-cyclohexylene group and is preferably unsubstituted. $R^1$ is preferably a linear alkyl group having 1 to 6 carbon atoms, in which a hydrogen atom, one —$CH_2$—, or two or more —$CH_2$—'s not adjoining each other are each independently optionally substituted with —O—, —COO—, —OCO—, or —O—CO—O—. $Z^{412}$ preferably represents an alkylene group having 1 to 7 carbon atoms, and more preferably an alkylene group having 1 to 5 carbon atoms; and the number of groups that replace one or more hydrogen atoms in the alkylene group and that are selected from —OH, —COOH, —$NH_2$, —$NO_2$, and —SH is preferably 1 or 2, and especially preferably 1.

In the case where the compound has a structure in which a hydrogen atom bonded to a carbon atom that is distant from the ring $A^1$ by two or more atoms including the oxygen atom as a linking group has been substituted with a group selected from —OH, —COOH, —$NH_2$, —$NO_2$, and —SH, the polar group contributes to a reduction in haze, and such a compound is therefore preferred. In particular, a compound having a structure involving substitution with an OH group effectively contributes to a reduction in haze and is therefore especially preferred.

At least one compound selected from the group consisting of compounds represented by General Formula (I-3) is preferred.

[Chem. 4]

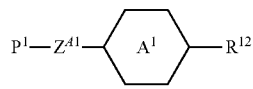

(I-3)

(in the formula, $P^1$, $Z^1$, and $A^1$ have the same definitions as those in General Formula (I-1); $R^{12}$ is a linear or branched alkyl group having 1 to 10 carbon atoms and a group selected from —OH, —COOH, —$NH_2$, —$NO_2$, and —SH; and in the alkyl group, one $CH_2$ group or two or more $CH_2$ groups not adjoining each other are each independently optionally substituted with —O—, —S—, —NH—, —N($CH_3$)—, —CO—, —COO—, —OCO—, —OCOO—, —SCO—, —COS—, —CH═CH—, or —C≡C— such that oxygen atoms, sulfur atoms, and an oxygen atom and sulfur atom are not directly bonded to each other) In particular, $P^1$ is preferably any of the groups represented by Formulae (P-1) and (P-2). $Z^{41}$ is especially preferably a linear alkylene group having 1 to 6 carbon atoms; in the alkylene group, one $CH_2$ group or two or more $CH_2$ groups not adjoining each other are optionally substituted with —O—, —CO—, —COO—, —OCO—, or —OCOO—. At least one hydrogen atom in the alkylene group is optionally substituted with a group selected from —OH, —COOH, —$NH_2$, —$NO_2$, and —SH. The ring $A^1$ represents a 1,4-phenylene group or a 1,4-cyclohexylene group and is preferably unsubstituted. $R^{12}$ preferably represents an alkyl group having 1 to 8 carbon atoms, more preferably an alkyl group having 1 to 5 carbon atoms, and especially preferably an alkyl group having 1 to 3 carbon atoms; and the number of groups that replace one or more hydrogen atoms in the alkyl group and that are selected from —OH, —COOH, —$NH_2$, —$NO_2$, and —SH is preferably 1 or 2, and especially preferably 1. Such a group to be selected for the replacement is especially preferably an OH group.

The polymerizable haze-reducing agent is preferably the compound (I) having at least one divalent alicyclic hydrocarbon group or aromatic hydrocarbon group as described above, but it depends on a combination of polymerizable liquid crystal compounds to be used in the polymerizable liquid crystal composition. In the case where at least one monofunctional polymerizable liquid crystal compound selected from compounds represented by General Formulae (II-2-1-2) to (II-2-1-4) and each having three or more ring structures and at least one difunctional polymerizable liquid crystal compounds and/or polyfunctional polymerizable liquid crystal compounds selected from compounds represented by General Formulae (II-2-2-2) to (II-2-2-4) and (II-2-3-2) to (II-2-3-8) and each having three or more ring structures are used in combination and where a mixture which contains such compounds in amounts greater than or equal to a certain levels relative to the total amount of polymerizable liquid crystal compounds to be used serves as a polymerizable liquid crystal compounds, using a polymerizable haze-reducing agent that is a compound which does not have at least one divalent alicyclic hydrocarbon group or aromatic hydrocarbon group but simply has at least one polymerizable functional group and at least one group selected from —OH, —COOH, —NH$_2$, —NO$_2$, and —SH and which is represented by General Formula (I-4) described later enables production of a polymerizable liquid crystal composition having an excellent orientation and reduced haze (compounds represented by General Formulae (II-2-1-2) to (II-2-1-4), (II-2-2-2) to (I-2-2-4), and (II-2-3-2) to (II-2-3-8) are explained in the following section (Combined Use of Polymerizable Liquid Crystal Compounds)). The haze-reducing agent used in the present invention has a polymerizable group and polar group that give an effect in which compounds can be further compatible in the polymerizable liquid crystal composition. Such an effect allows a coating film to maintain uniformity without haze being increased. This haze-reducing agent also has another effect in which orientation is impaired. Such an effect of impairing orientation is smaller in a compound that has a ring structure and that is similar to the polymerizable liquid crystal compounds in terms of the structure. A compound having three or more ring structures has greater liquid crystal properties than a compound having two ring structures and is therefore less likely to impair orientation. Accordingly, in the case where a mixture of polymerizable liquid crystal compounds including at least one monofunctional polymerizable liquid crystal compound selected from compounds having three or more ring structures and represented by General Formulae (II-2-1-2) to (II-2-1-4) and at least one difunctional polymerizable liquid crystal compound and/or polyfunctional polymerizable liquid crystal compound selected from compounds having three or more ring structures and represented by General Formulae (II-2-2-2) to (II-2-2-4) and (II-2-3-2) to (II-2-3-8) serves as the polymerizable liquid crystal compound, using a polymerizable haze-reducing agent not having at least one divalent alicyclic hydrocarbon group or aromatic hydrocarbon group enables production of a polymerizable liquid crystal composition having an excellent orientation and reduced haze.

[Chem. 5]

$$P^1—R^{13} \tag{I-4}$$

(in the formula, P$^1$ has the same definition as that in General Formula (I-1); R$^{13}$ represents a linear or branched alkyl group having 1 to 10 carbon atoms, in which at least one hydrogen atom has been substituted with a group selected from —OH, —COOH, —NH$_2$, —NO$_2$, and —SH; and in the alkyl group, one or more CH$_2$ groups are each independently optionally substituted with —O—, —S—, —NH—, —N(CH$_3$)—, —CO—, —COO—, —OCO—, —OCOO—, —SCO—, —COS—, —CH=CH—, or —C≡C— such that oxygen atoms, sulfur atoms, and an oxygen atom and sulfur atom are not directly bonded to each other) In particular, P$^1$ is preferably any of the groups represented by Formulae (P-1) and (P-2). R$^{13}$ preferably represents an alkyl group having 1 to 8 carbon atoms; and the number of groups that replace one or more hydrogen atoms in the alkyl group and that are selected from —OH, —COOH, —NH$_2$, —NO$_2$, and —SH is preferably 1 or 2, and especially preferably 1. Such a group to be selected for the replacement is preferably —OH, —COOH, —NH$_2$, or —NO$_2$; and especially preferably an —OH.

The amount of the polymerizable haze-reducing agent is preferably in the range of 0.1 to 20 parts by mass, more preferably 0.5 to 15 parts by mass, further preferably 1 to 10 parts by mass, and especially preferably 1 to 9 parts by mass relative to 100 parts by mass of the total amount of the polymerizable liquid crystal compounds contained in the polymerizable liquid crystal composition. The polymerizable haze-reducing agent to be contained in the polymerizable liquid crystal composition in an amount within a specific range enables the composition to have a good orientation and further reduced haze.

(Polymerizable Liquid Crystal Compound)

Any polymerizable liquid crystal compound can be used in the present invention provided that the compound has at least one polymerizable functional group and liquid crystal properties when it is used alone or in combination with another compound. Known polymerizable liquid crystal compounds can be used.

Examples of the polymerizable liquid crystal compounds include rod-like polymerizable liquid crystal compounds each having a polymerizable functional group, such as a vinyl group, an acryl group, or a (meth)acryl group, and a rigid part called mesogen in which multiple structures such as 1,4-phenylene group and a 1,4-cyclohexylene group are boded to each other, which are disclosed in *Handbook of Liquid Crystals* (D. Demus, J. W. Goodby, G. W. Gray, H. W. Spiess, V. Vill, Eds.; Wiley-VCH: 1998); Ekisho no Kagaku. *Kikan kagaku sosetsu No. 22*. (The Chemical Society of Japan: 1994); and Japanese Unexamined Patent Application Publication Nos. 7-294735, 8-3111, 8-29618, 11-80090, 11-116538, and 11-148079, and rod-like polymerizable liquid crystal compounds each having a maleimide group, which are disclosed in Japanese Unexamined Patent Application Publication Nos. 2004-2373 and 2004-99446. In particular, the rod-like liquid crystal compound having a polymerizable group can be easily produced so as to have a liquid crystal temperature within a range including a low temperature close to room temperature, and such a rod-like liquid crystal compound is therefore preferred.

Specifically, the polymerizable liquid crystal compound is preferably any of compounds represented by General Formula (II).

[Chem. 6]

$$P^2—(S^1—X^1)_{q1}\text{-MG-}R^2 \tag{II}$$

In the formula, P$^2$ represents a polymerizable functional group; S$^1$ represents an alkylene group having 1 to 18 carbon atoms (in the alkylene group, a hydrogen atom is optionally substituted with at least one halogen atom, CN group, or alkyl group having 1 to 8 carbon atoms and a polymerizable functional group; and one CH$_2$ group or two or more CH$_2$ groups not adjoining each other are each independently optionally substituted with —O—, —COO—, —OCO—, or —OCO—O—); X$^1$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond (where P$^2$—S$^1$ and S$^1$—X$^1$ exclude —O—O—, —O—NH—, —S—S—, and —O—S—); q1 represents 0 or 1; MG represents a mesogenic group; R$^z$ represents a hydrogen atom, a halogen atom, a cyano group, or a linear or branched alkyl group having 1 to 12 carbon atoms; the alkyl group may be linear or branched; in the alkyl group, one —CH$_2$— or two or more —CH$_2$-'s not adjoining each other are each independently optionally substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—; R² alternatively represents a group represented by General Formula (II-a).

[Chem. 7]

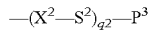

(II-a)

(in the formula, P³ represents a polymerizable functional group; S² has the same definition as S¹; X² has the same definition as X¹ (where P³—S² and S²—X² exclude —O—O—, —O—NH—, —S—S—, and —O—S—); and q² represents 0 or 1); and the mesogenic group MG is represented by General Formula (II-b)

[Chem. 8]

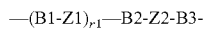

(II-b)

(in the formula, B1, B2, and B3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have, as a substituent, at least one selected from F, Cl, CF₃, OCF₃, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkoxycarbonyl group having 1 to 8 carbon atoms, an alkenyl group having 2 to 8 carbon atoms, an alkenyloxy group having 2 to 8 carbon atoms, an alkenoyl group having 2 to 8 carbon atoms, an alkenoyloxy group having 2 to 8 carbon atoms, and/or a substituent represented by General Formula (II-c)

[Chem. 9]

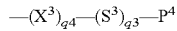

(II-c)

(in the formula, P⁴ represents a polymerizable functional group; S³ has the same definition as S¹; X³ represents —O—, —COO—, —OCO—, —OCH₂—, —CH₂O—, —CH₂CH₂OCO—, —COOCH₂CH₂—, —OCOCH₂CH₂—, or a single bond; q³ represents 0 or 1; q⁴ represents 0 or 1 (where P⁴—S³ and S³—X³ exclude —O—O—, —O—NH—, —S—S—, and —O—S—)); Z1 and Z2 each independently represent —COO—, —OCO—, —CH₂CH₂—, —OCH₂—, —CH₂O—, —CH=CH—, —C≡C—, —CH=CHCOO—, —OCOCH=CH—, —CH₂CH₂COO—, —CH₂CH₂OCO—, —COOCH₂CH₂—, —OCOCH₂CH₂—, —C=N—, —N=C—, —CONH—, —NHCO—, —C(CF₃)₂—, an alkyl group having 2 to 10 carbon atoms and optionally a halogen atom, or a single bond; r1 represents 0, 1, 2, or 3; and in the case where B1 and Z1 are multiple, the corresponding ones of them may be the same as or different from each other)

P², P³, and P⁴ each independently represent a substituent selected from polymerizable groups represented by Formulae (P-2-1) to (P-2-20).

[Chem. 10]

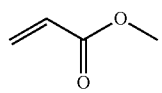

(P-2-1)

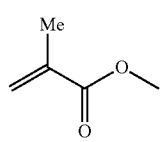

(P-2-2)

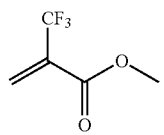

(P-2-3)

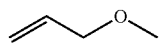

(P-2-4)

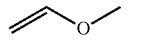

(P-2-5)

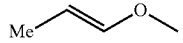

(P-2-6)

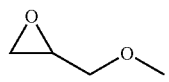

(P-2-7)

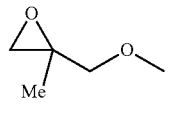

(P-2-8)

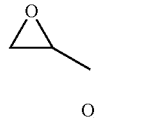

(P-2-9)

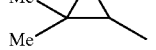

(P-2-10)

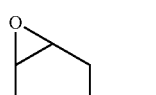

(P-2-11)

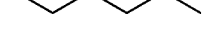

(P-2-12)

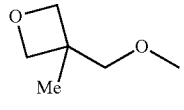

(P-2-13)

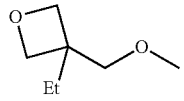

(P-2-14)

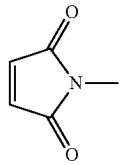

(P-2-15)

HS—

-continued

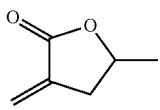 (P-2-16)

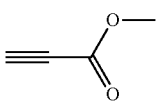 (P-2-17)

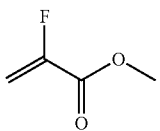 (P-2-18)

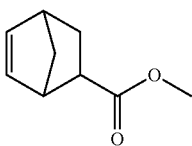 (P-2-19)

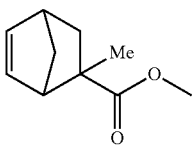 (P-2-20)

Among such polymerizable functional groups, the functional groups represented by Formulae (P-2-1), (P-2-2), (P-2-7), (P-2-12), and (P-2-13) are preferred in terms of an enhancement in polymerizability; and the functional groups represented by Formulae (P-2-1) and (P-2-2) are more preferred.

(Monofunctional Polymerizable Liquid Crystal Compound)

Among compounds represented by General Formula (II), a preferred monofunctional polymerizable liquid crystal compound having one polymerizable functional group per molecule is any of compounds represented by General Formula (II-2-1).

[Chem. 11]

$$P^2—(S^1—X^1)_{q1}\text{-MG-}R^{21} \quad \text{(II-2-1)}$$

In the formula, $P^2$, $S^1$, $X^1$, q1, and MG have the same definitions as those in General Formula (II); $R^{21}$ represents a linear or branched alkyl group having 1 to 12 carbon atoms or a linear or branched alkenyl group having 1 to 12 carbon atoms, in which a hydrogen atom, a halogen atom, a cyano group, one —$CH_2$—, or two or more —$CH_2$-'s not adjoining each other are each independently optionally substituted with —O—, —S—, —CO—, —COO—, —OCO—, —CO—S—, —S—CO—, —O—CO—O—, —CO—NH—, —NH—CO—, —NH—, —N($CH_3$)—, —CH=CH—COO—, —CH=CH—COO—, —CH=CH—OCO—, —COO—CH=CH—, —OCO—CH=CH—, —CH=CH—, —CF=CF—, or —C≡C—; in each of the alkyl group and alkenyl group, at least one hydrogen atom is optionally substituted with a halogen atom or a cyano group; and in the case where multiple hydrogen atoms are subjected to the substitution, they may be substituted with the same substituent or different substituents. Examples of the compound represented by General Formula (II-2-1) include, but are not limited to, compounds represented by General Formulae (II-2-1-1) to (II-2-1-4).

[Chem. 12]

$$P^2—(S^1—X^1)_{q1}\text{—B2Z2B3}R^{21} \quad \text{(II-2-1-1)}$$

$$P^2—(S^1—X^1)_{q1}\text{—B11-Z11-B2-Z2-B3-}R^{21} \quad \text{(II-2-1-2)}$$

$$P^2—(S^1—X^1)_{q1}\text{—B11-Z11-B12-Z12-B2-Z2-B3-}R^{21} \quad \text{(II-2-1-3)}$$

$$P^2—(S^1—X^1)_{q1}\text{—B11-Z11-B12-Z12-B13-Z13-B2-Z2-B3-}R^{21} \quad \text{(II-2-1-4)}$$

In the formulae, $P^2$, $S^1$, $X^1$, and q1 have the same definitions as those in General Formula (II);

B11, B12, B13, B2, and B3 have the same definitions as B1 to B3 in General Formula (II-b); B11, B12, B13, B2, and B3 may be the same as or different from each other;

Z11, Z12, Z13, and Z2 have the same definitions as Z1 to Z3 in General Formula (II-b); Z1, Z12, Z13, and Z2 may be the same as or different from each other;

$R^{21}$ represents a linear or branched alkyl group having 1 to 12 carbon atoms or a linear or branched alkenyl group having 1 to 12 carbon atoms, in which a hydrogen atom, a halogen atom, a cyano group, one —$CH_2$—, or two or more —$CH_2$-'s not adjoining each other are each independently optionally substituted with —O—, —S—, —CO—, —COO—, —OCO—, —CO—S—, —S—CO—, —O—CO—O—, —CO—NH—, —NH—CO—, —NH—, —N($CH_3$)—, —CH=CH—COO—, —CH=CH—OCO—, —COO—CH=CH—, —OCO—CH=CH—, —CH=CH—, —CF=CF—, or —C≡C—; in each of the alkyl group and alkenyl group, at least one hydrogen atom is optionally substituted with a halogen atom or a cyano group; and in the case where multiple hydrogen atoms are subjected to the substitution, they may be substituted with the same substituent or different substituents.

Examples of the compounds represented by General Formulae (II-2-1-1) to (II-2-1-4) include, but are not limited to, compounds represented by Formulae (II-2-1-1-1) to (II-2-1-1-26).

[Chem. 13]

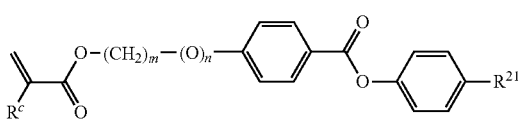 (II-2-1-1-1)

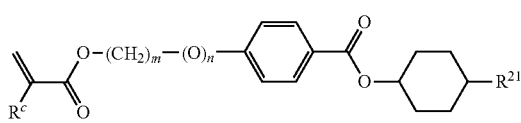 (II-2-1-1-2)

(II-2-1-1-3)

(II-2-1-1-4)

(II-2-1-1-5)
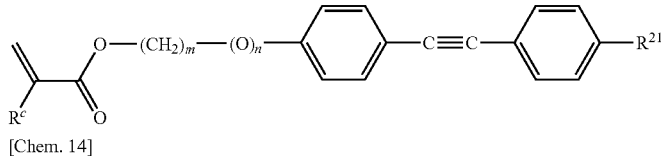
[Chem. 14]
(II-2-1-1-6)
(II-2-1-1-7)
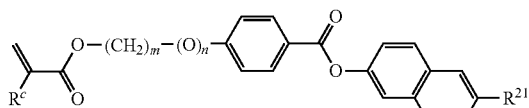
(II-2-1-1-8)
(II-2-1-1-9)
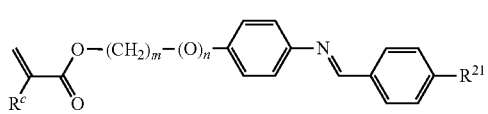
(II-2-1-1-10)
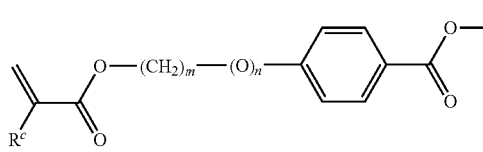
(II-2-1-1-11)
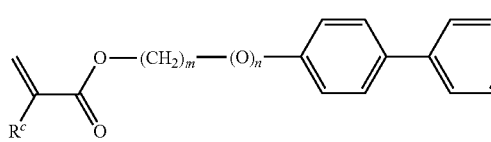
[Chem. 15]
(II-2-1-1-12)
(II-2-1-1-13)
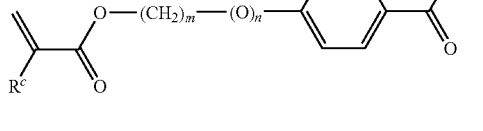
(II-2-1-1-14)
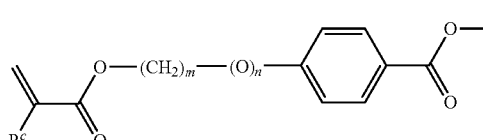
(II-2-1-1-15)
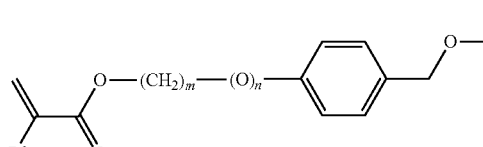

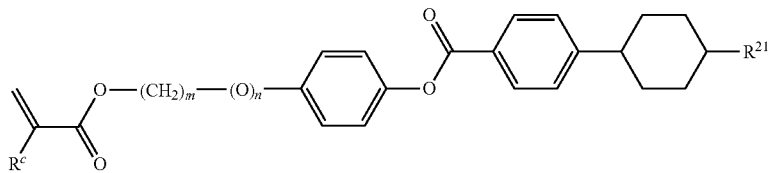
(II-2-1-1-16)
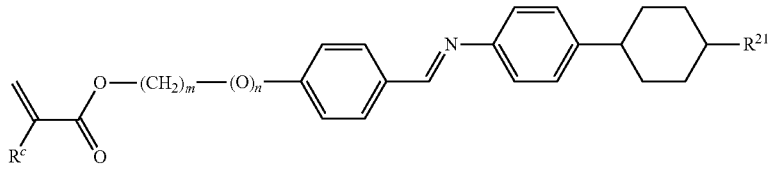
(II-2-1-1-17)
[Chem. 16]
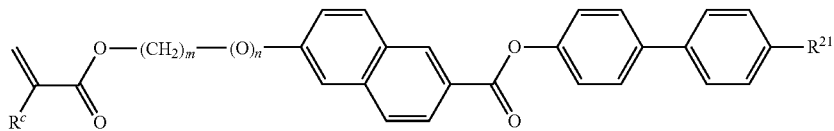
(II-2-1-1-18)
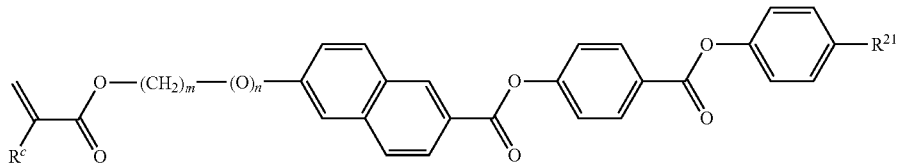
(II-2-1-1-19)
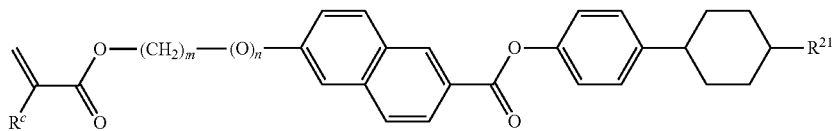
(II-2-1-1-20)
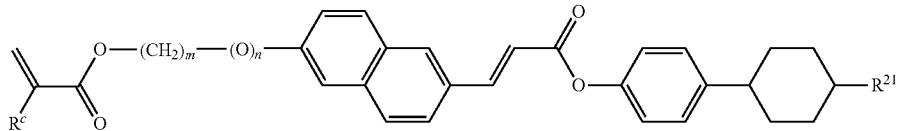
(II-2-1-1-21)
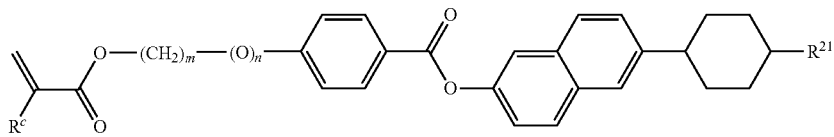
(II-2-1-1-22)
[Chem. 17]
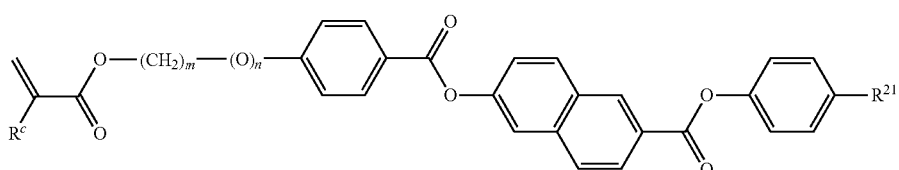
(II-2-1-1-23)
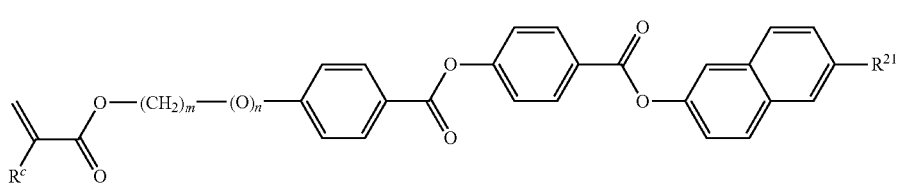
(II-2-1-1-24)

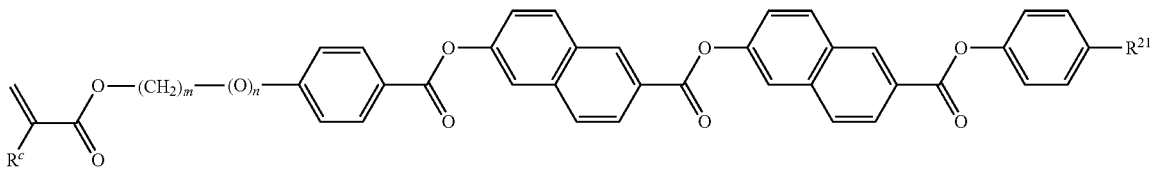

(II-2-1-1-25)

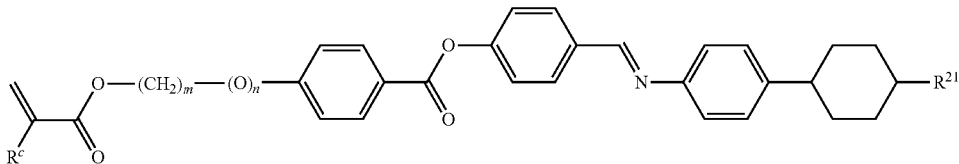

(II-2-1-1-26)

In each of the formulae, $R^c$ represents a hydrogen atom or a methyl group; m represents an integer from 0 to 18; n represents 0 or 1; $R^{21}$ has the same definition as that in General Formulae (II-2-1-1) to (II-2-1-4); $R^{21}$ preferably represents a linear alkyl or alkenyl group having 1 to 6 carbon atoms, in which a hydrogen atom, a halogen atom, a cyano group, or one —$CH_2$— is optionally substituted with —O—, —CO—, —COO—, or —OCO—;

the cyclic group optionally has, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkoxycarbonyl group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms.

The total amount of the monofunctional polymerizable liquid crystal compounds having one polymerizable functional group per molecule is preferably in the range of 0 to 90 mass %, more preferably 5 to 85 mass %, and especially preferably 10 to 80 mass % relative to the total amount of the polymerizable liquid crystal compounds to be used. In terms of orientation in an optically anisotropic body, the lower limit of the amount is preferably 10 mass % or higher, and more preferably 20 mass % or higher; in terms of rigidity, the upper limit is preferably 80 mass % or lower, and more preferably 70 mass % or lower.

(Difunctional Polymerizable Liquid Crystal Compound)

Among compounds represented by General Formula (II), a preferred difunctional polymerizable liquid crystal compound having two polymerizable functional groups per molecule is any of compounds represented by General Formula (II-2-2).

[Chem. 18]

$$P^2-(S^1-X^1)_{q1}\text{-MG-}(X^2S^2)_{q2}-P^3 \qquad (II-2-2)$$

In the formula, $P^2$, $S^1$, $X^1$, q1, MG, $X^2$, $S^2$, q2, and $P^3$ have the same definitions as those in General Formula (II). Examples of the compound represented by General Formula (II-2-2) include, but are not limited to, compounds represented by General Formulae (II-2-2-1) to (II-2-2-4).

[Chem. 19]

$$P^2-(S^1-X^1)_{q1}-B2-Z2-B3-(X^2-S^2)_{q2}-P^3 \qquad (II-2-2-1)$$

$$P^2-(S^1-X^1)_{q1}-B11-Z11-B2-Z2-B3-(X^2-S^2)_{q2}-P^3 \qquad (II-2-2-2)$$

$$P^2-(S^1-X^1)_{q1}-B11-Z11-B12-Z12-B2-Z2-B3-(X^2-S^2)_{q2}-P^3 \qquad (II-2-2-3)$$

$$P^2-(S^1-X^1)_{q1}-B11-Z11B12Z12B12B13-Z13-B2-Z2-B3-(X^2-S^2)_{q2}-P^3 \qquad (II-2-2-4)$$

In the formulae, $P^2$, $S^1$, $X^1$, q1, MG, $X^2$, $S^2$, q2, and $P^3$ have the same definitions as those in General Formula (II); B11, B12, B13, B2, and B3 have the same definitions as B1 to B3 in General Formula (II-b) and may be the same as or different from each other; and Z11, Z12, Z13, and Z2 have the same definitions as Z1 to Z3 in General Formula (II-b) and may be the same as or different from each other.

Among the compounds represented by General Formulae (II-2-2-1) to (II-2-2-4), the compounds represented by General Formulae (II-2-2-2) to (II-2-2-4) and each having three or more ring structures are preferred because using such compounds enables excellent orientation, and the compound represented by General Formula (II-2-2-2) and having three or more ring structures is especially preferred.

Examples of the compounds represented by General Formulae (II-2-2-1) to (II-2-2-4) include, but are not limited to, compounds represented by Formulae (II-2-2-1-1) to (II-2-2-1-21).

[Chem. 20]

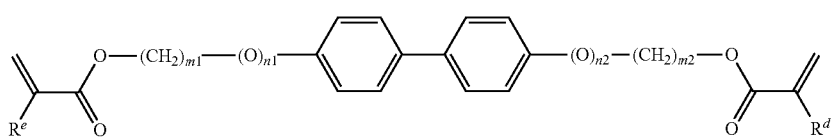

(II-2-2-1-1)

-continued
(II-2-2-1-2)
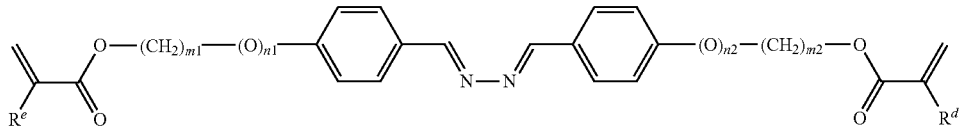
(II-2-2-1-3)
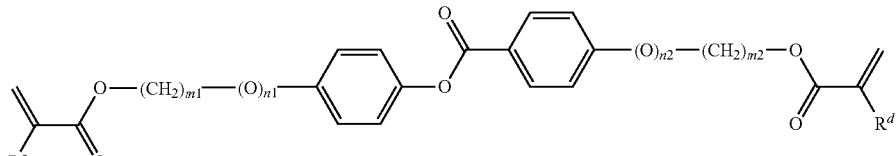
(II-2-2-1-4)
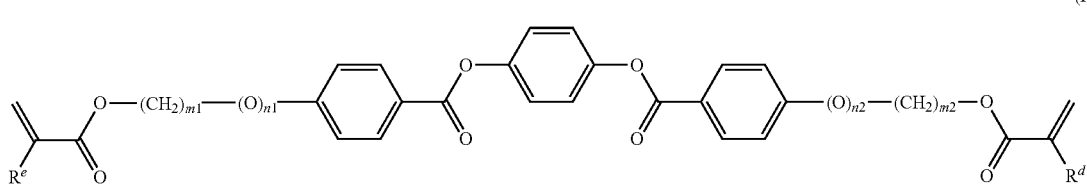
(II-2-2-1-5)
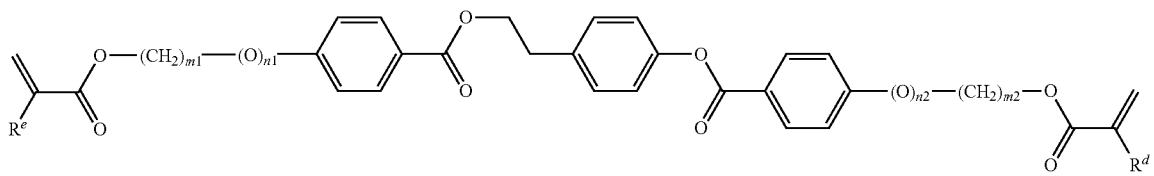
[Chem. 21]
(II-2-2-1-6)
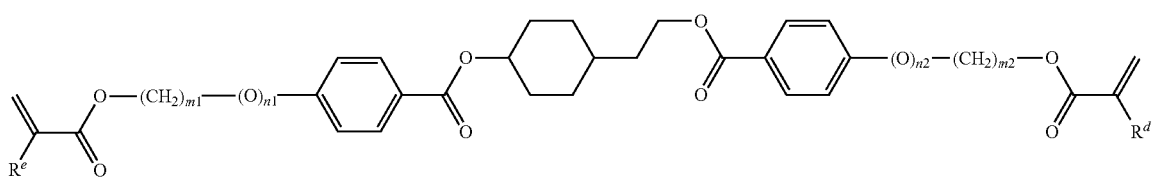
(II-2-2-1-7)
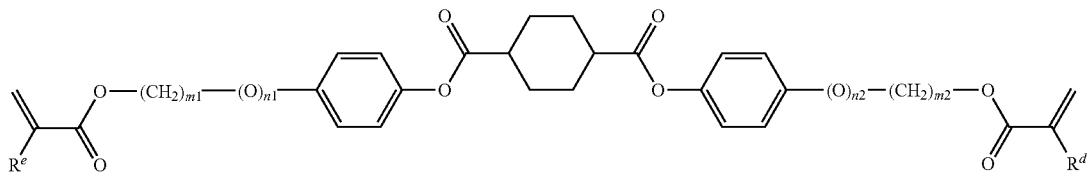
(II-2-2-1-8)
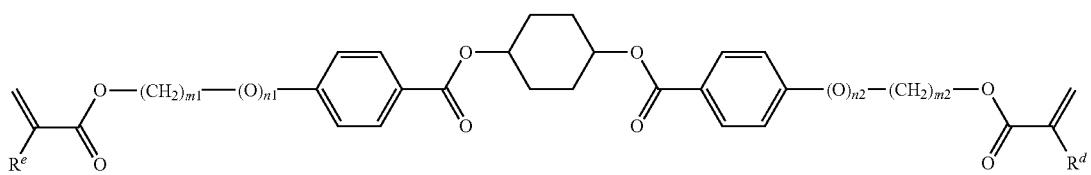
(II-2-2-1-9)
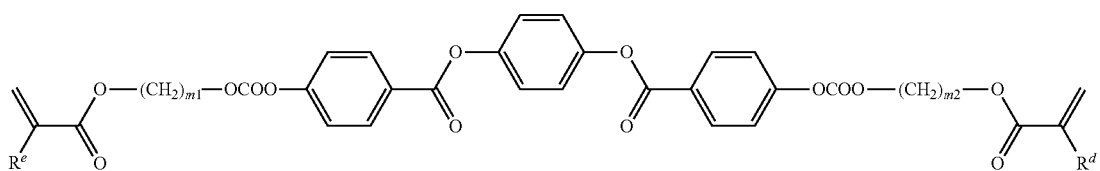

(II-2-2-1-10)
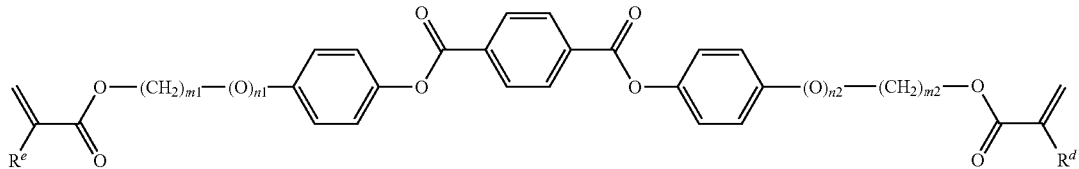
[Chem. 22]
(II-2-2-1-11)
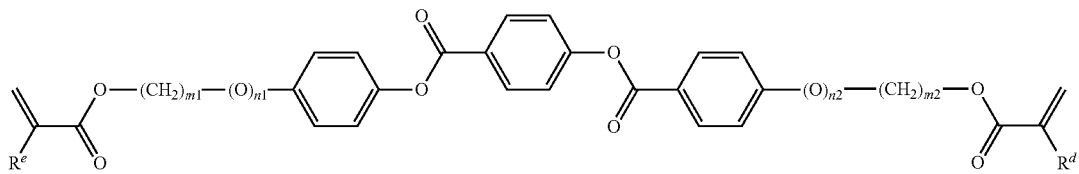
(II-2-2-1-12)
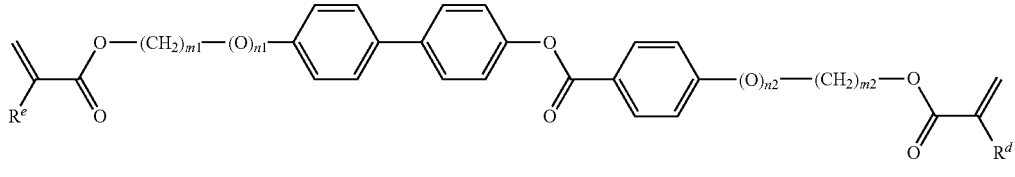
(II-2-2-1-13)
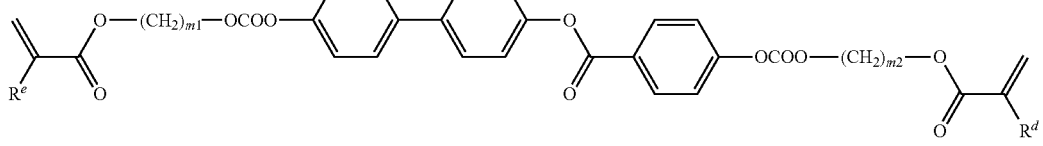
(II-2-2-1-14)
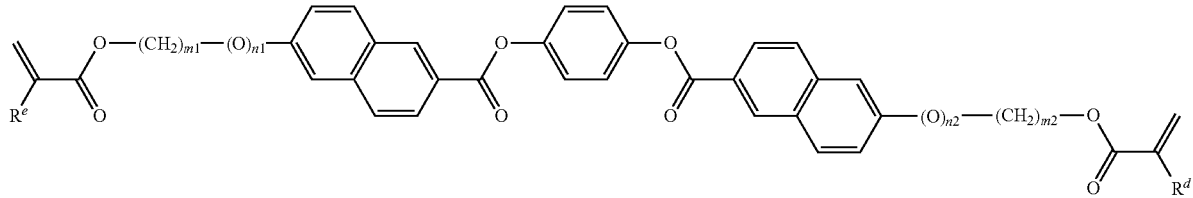
(II-2-2-1-15)
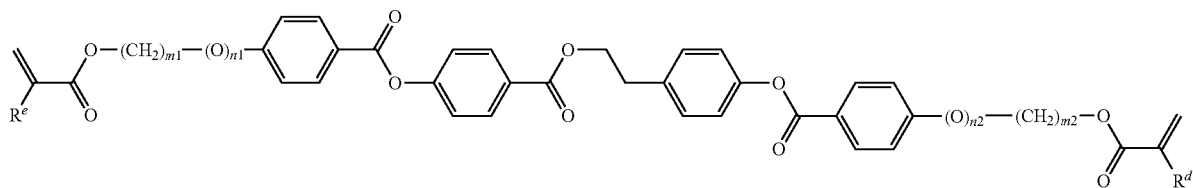
[Chem. 23]
(II-2-2-1-16)
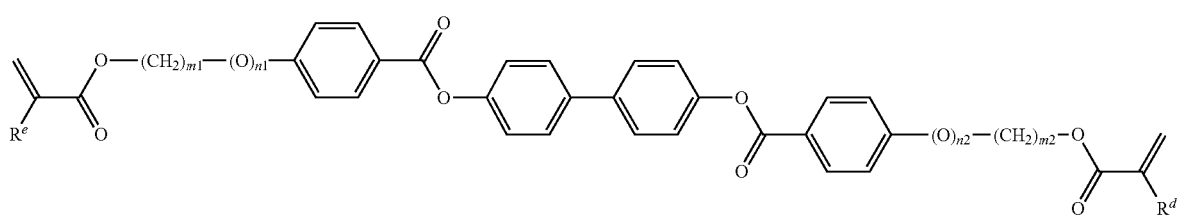

-continued (II-2-2-1-17)
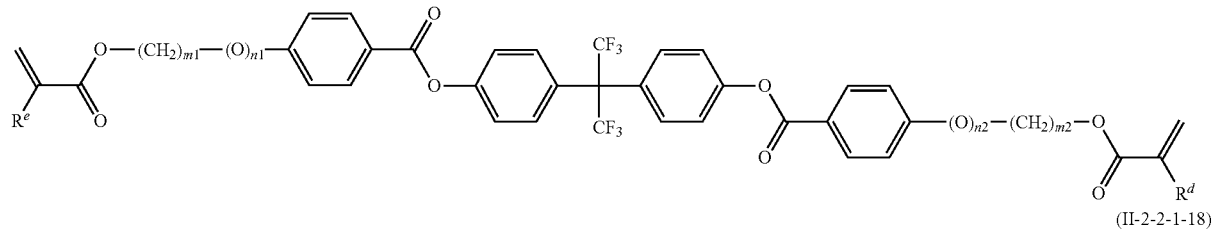

(II-2-2-1-18)
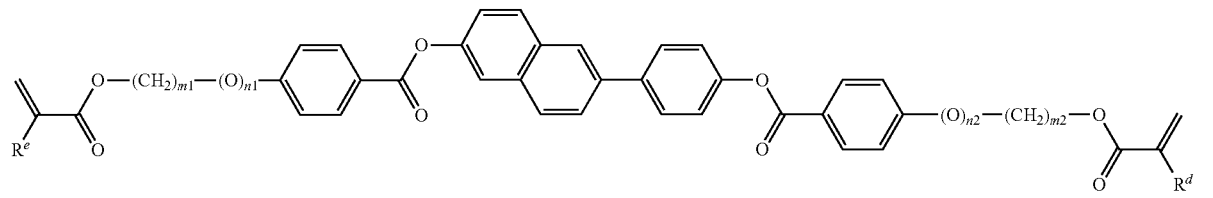

(II-2-2-1-19)
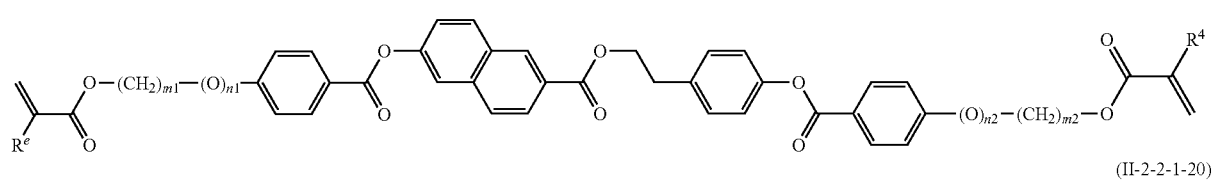

(II-2-2-1-20)
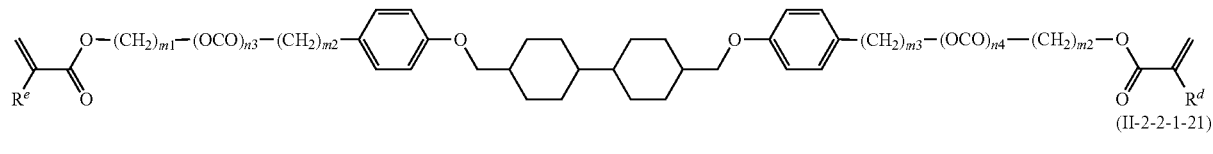

(II-2-2-1-21)
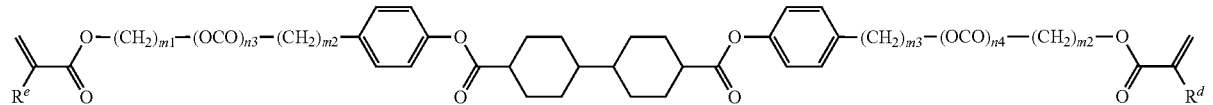

In the formulae, $R^d$ and $R^e$ each independently represent a hydrogen atom or a methyl group; the cyclic group optionally has, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkoxycarbonyl group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms; m1 and m2 each independently represent an integer from 0 to 18; and n1, n2 n3, and n4 each independently represent 0 or 1.

At least one liquid crystal compound having two polymerizable functional groups can be used; one to five compounds are preferably used, and two to five compounds are more preferably used.

The total amount of the difunctional polymerizable liquid crystal compounds each having two polymerizable functional groups per molecule is preferably from 0 to 90 mass %, more preferably 10 to 85 mass %, and especially 15 to 80 mass % relative to the total amount of polymerizable liquid crystal compounds to be used. In terms of rigidity, the lower limit of the amount is preferably 30 mass % or higher, and more preferably 50 mass % or higher; in terms of the orientation of an optically anisotropic body, the upper limit of the amount is preferably 80 mass % or lower, and more preferably 70 mass % or lower.

(Polyfunctional Polymerizable Liquid Crystal Compound)

A preferred polyfunctional polymerizable liquid crystal compound having tree or more polymerizable functional groups is a compound having three polymerizable functional groups. Among compounds represented by General Formula (II), a preferred polyfunctional polymerizable liquid crystal compound having three polymerizable functional groups per molecule is any of compounds represented by General Formula (II-2-3).

[Chem. 24]

(II-2-3)
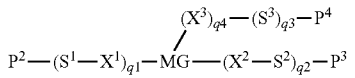

In the formula, $P^2$, $S^1$, $X^1$, q1, MG, $X^2$, $S^2$, q2, $P^3$, $X^3$, q4, $S^3$, q3, $P^4$ have the same definitions as those in General Formula (II). Examples of the compound represented by General Formula (II-2-3) include, but are not limited to, compounds represented by General Formulae (II-2-3-1) to (II-2-3-8).

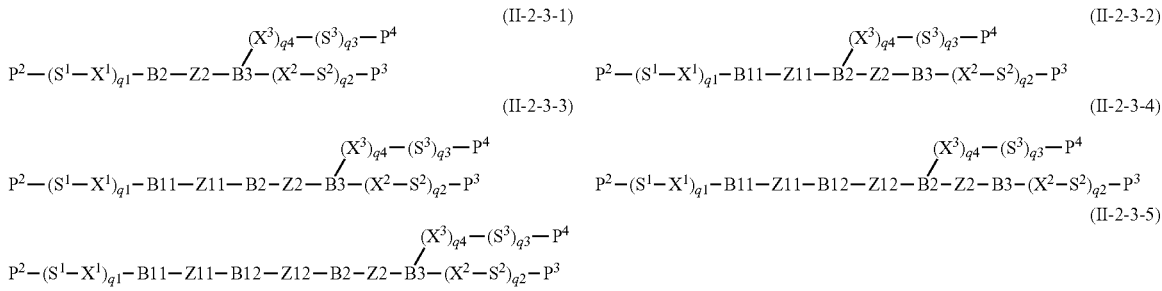

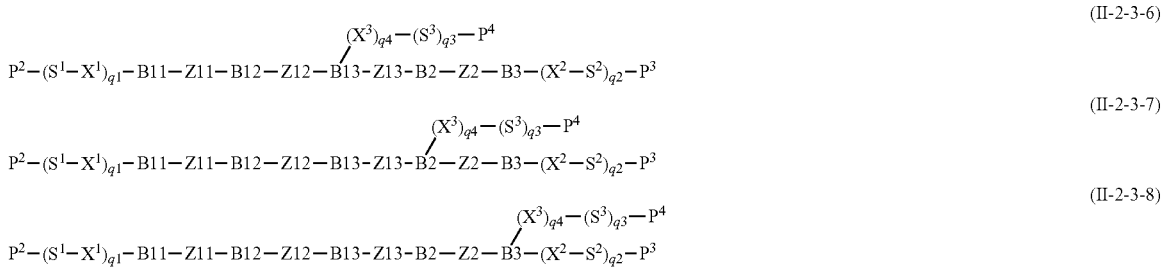

In the formulae, $P^2$, $S^1$, $X^1$, q1, MG, $X^2$, $S^2$, q2, $P^3$, $X^3$, q4, $S^3$, q3, and $P^4$ have the same definitions as those in General Formula (II);

B11, B12, B13, B2, and B3 have the same definitions as B1 to B3 in General Formula (II-b) and may be the same as or different from each other;

Z11, Z12, Z13, and Z2 have the same definitions as Z1 to Z3 in General Formula (II-b) and may be the same as or different from each other.

Examples of the compounds represented by General Formulae (II-2-3-1) to (II-2-3-8) include, but are not limited to, compounds represented by Formulae (II-2-3-1-1) to (II-2-3-1-6).

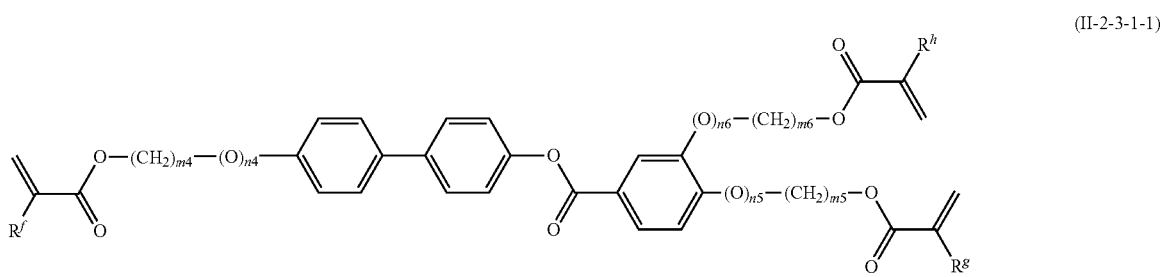

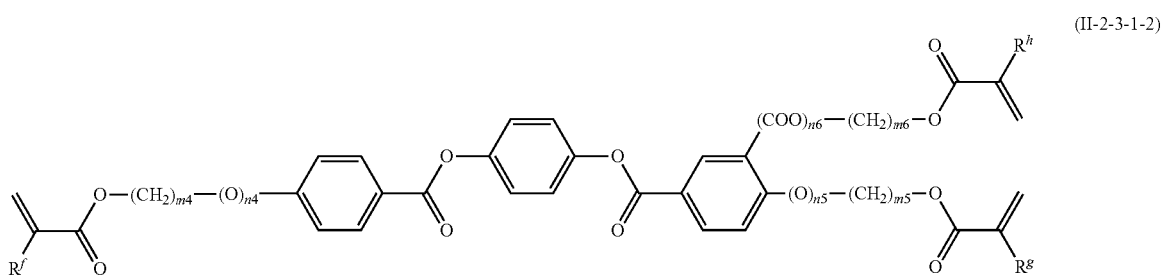

(II-2-3-1-3)

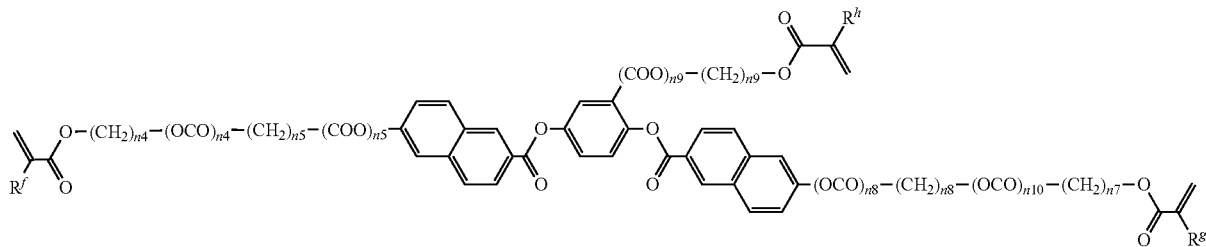

[Chem. 28]

(II-2-3-1-4)

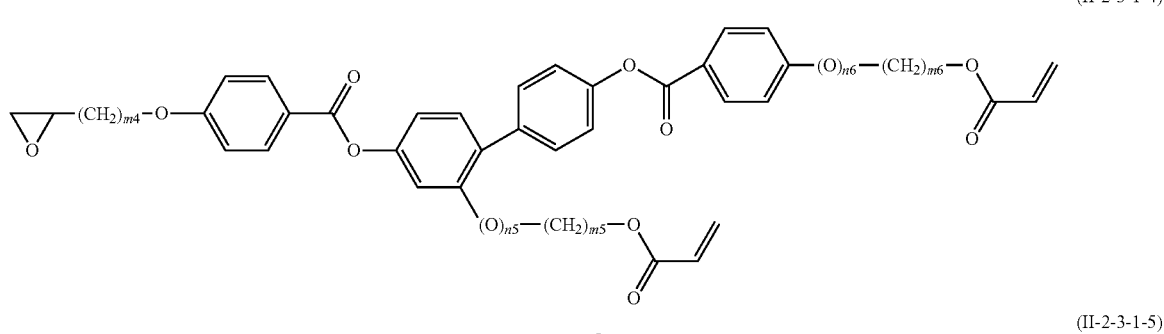

(II-2-3-1-5)

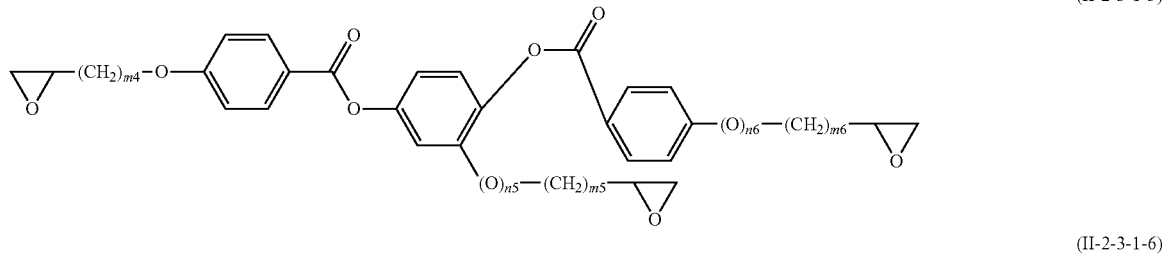

(II-2-3-1-6)

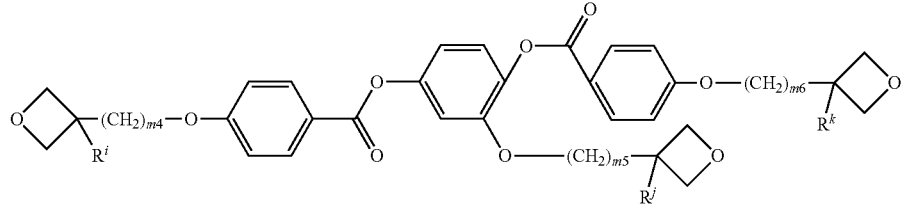

In the formulae, $R^f$, $R^g$, and $R^h$ each independently represent a hydrogen atom or a methyl group; $R^i$, $R^j$, and $R^k$ each independently represent a hydrogen atom, a halogen atom, an alkyl group having 1 to 6 carbon atoms, an alkoxy group having 1 to 6 carbon atoms, or a cyano group; in the case where these groups are each an alkyl group having 1 to 6 carbon atoms or an alkoxy group having 1 to 6 carbon atoms, all of them are optionally unsubstituted or substituted with one or more halogen atoms; the cyclic group optionally has, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkoxycarbonyl group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms;

m4 to m9 each independently represent an integer from 0 to 18; and n4 to n9 each independently represent 0 or 1.

One or more polyfunctional polymerizable liquid crystal compounds each having three or more polymerizable functional groups can be used.

The total amount of the polyfunctional polymerizable liquid crystal compounds each having three or more polymerizable functional groups per molecule is preferably from 0 to 80 mass %, more preferably 0 to 60 mass %, and especially preferably 0 to 40 mass % relative to the total amount of the polymerizable liquid crystal compounds to be used. In terms of the rigidity of an optically anisotropic body, the lower limit of the amount is preferably 10 mass % or higher, more preferably 20 mass % or higher, and especially preferably 30 mass % or higher; in terms of a reduction in shrinkage on cure, the upper limit thereof is preferably 60 mass % or lower, more preferably 50 mass % or lower, and especially preferably 40 mass % or lower.

(Combined Use of Polymerizable Liquid Crystal Compounds)

In the polymerizable liquid crystal composition of the present invention, it is preferred that different types of the above-mentioned polymerizable liquid crystal compounds be mixed. Using at least one of the monofunctional polymerizable liquid crystal compounds and at least one of the difunctional polymerizable liquid crystal compounds and/or at least one of polyfunctional polymerizable liquid crystal compounds in combination is preferred because it reduces shrinkage on cure and thus enables an enhancement in adhesion. In particular, in the case where an optically anisotropic body produced by using the polymerizable liquid crystal composition of the present invention needs to have an enhanced orientation, a monofunctional polymerizable liquid crystal compound selected from compounds represented by Formulae (II-2-1-2) to (II-2-1-4) and having three or more ring structures and a difunctional polymerizable liquid crystal compound selected from compounds represented by Formulae (II-2-2-2) to (II-2-2-4) and having three or more ring structures are preferably used in the form of a mixture of polymerizable liquid crystal compounds, a mixture in which the amount of the compounds represented by Formulae (II-2-1-2) and (II-2-2-2) and having three ring structures has adjusted to be not less than 70 mass % relative to the total amount of polymerizable liquid crystal compounds to be used is more preferred, and a mixture in which the amount of the compounds represented by Formulae (II-2-1-2) and (II-2-2-2) has adjusted to be not less than 75 mass % relative to the total amount of polymerizable liquid crystal compounds to be used is especially preferred.

(Other Liquid Crystal Compounds)

The liquid crystal composition of the present invention may contain a compound containing a mesogenic group that is free from a polymerizable group; and examples of such a compound include compounds used in general liquid crystal devices such as STN (super twisted nematic) liquid crystal devices, TN (twisted nematic) liquid crystal devices, and TFT (thin film transistor) liquid crystal devices.

Specifically, the compound containing a mesogenic group having no polymerizable functional group is preferably any of compounds represented by General Formula (5).

[Chem. 29]

$R^{51}$-MG3-$R^{52}$ (5)

MG3 is a mesogenic group or mesogenic supporting group represented by General Formula (5-b).

[Chem. 30]

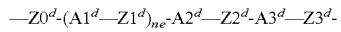

—$Z0^d$-($A1^d$—$Z1^d$)$_{ne}$-$A2^d$—$Z2^d$-$A3^d$—$Z3^d$- (5-b)

(in the formula, $A1^d$, $A2^d$, and $A3^d$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms;

$Z0^d$, $Z1^d$, $Z2^d$, and $Z3^d$ each independently represent —COO—, —OCO—, —$CH_2$ $CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$ OCO—, —COO$CH_2CH_2$—, —OCO$CH_2CH_2$—, —CONH—, —NHCO—, an alkylene group having 2 to 10 carbon atoms and optionally a halogen atom, or a single bond; ne represents 0, 1, or 2;

$R^{51}$ and $R^{52}$ each independently represent a hydrogen atom, a halogen atom, a cyano group, or an alkyl group having 1 to 18 carbon atoms; the alkyl group is optionally substituted with at least one halogen atom or CN; and in the alkyl group, one $CH_2$ group or two or more $CH_2$ groups not adjoining each other are each independently optionally substituted with —O—, —S—, —NH—, —N($CH_3$)—, —CO—, —COO—, —OCO—, —OCOO—, —SCO—, —COS—, or —C≡C— such that oxygen atoms are not directly bonded to each other)

Specific examples of such a compound include, but are not limited to, the following compounds.

[Chem. 31]

(5-1)

(5-2)

(5-3)

[Chem. 32]

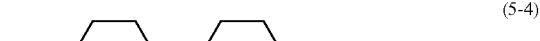

(5-4)

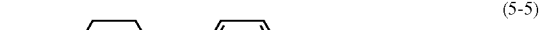

(5-5)

(5-6)

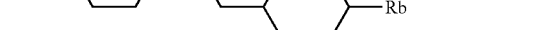

(5-7)

(5-8)

Ra and Rb each independently represent a hydrogen atom, an alkyl group having 1 to 6 carbon atoms, an alkoxy group having 1 to 6 carbon atoms, an alkenyl group having 1 to 6 carbon atoms, or a cyano group; in the case where Ra and Rb are each an alkyl group having 1 to 6 carbon atoms or an alkoxy group having 1 to 6 carbon atoms, all of them may be unsubstituted or substituted with one or more halogen atoms.

The total amount of compounds each containing a mesogenic group is preferably in the range of 0 mass % to 20 mass % relative to the amount of the whole polymerizable liquid crystal composition. In the case where such compounds are used, the total amount is preferably not less than 1 mass %, also preferably not less than 2 mass %, and also preferably not less than 5 mass %; in addition, it is preferably not more than 15 mass %, and also preferably not more than 10 mass %.

(Other Components)
(Chiral Compounds)

In addition to the polymerizable compound represented by General Formula (II), the polymerizable liquid crystal composition of the present invention can contain a polymerizable chiral compound that may be liquid crystalline or non-liquid crystalline.

The polymerizable chiral compound to be used in the present invention preferably contains at least one polymerizable functional group. Examples of such a compound include polymerizable chiral compounds containing chiral sugars, such as isosorbide, isomannite, and glucoside, and also having a rigid moiety, such as a 1,4-phenylene group or 1,4-cyclohexlene group, and a polymerizable functional group, such as a vinyl group, an acryloyl group, a (meth) acryloyl group, or a maleimide group, as disclosed in Japanese Unexamined Patent Application Publication Nos. 11-193287, 2001-158788, 2007-269639, 2007-269640, and 2009-84178, and Japanese Unexamined Patent Application Publication (Translation of PCT Application) No. 2006-52669; polymerizable chiral compounds formed of terpenoid derivatives as disclosed in Japanese Unexamined Patent Application Publication No. 8-239666; polymerizable chiral compounds each having a spacer with a mesogenic group and a chiral moiety as disclosed in, for example, NATURE VOL. 35, 467 to 469 (issued on Nov. 30, 1995) and NATURE VOL. 392, 476 to 479 (issued on Apr. 2, 1998); and polymerizable chiral compounds containing a binaphthyl group as disclosed in Japanese Unexamined Patent Application Publication (Translation of PCT Application) No. 2004-504285 and Japanese Unexamined Patent Application Publication No. 2007-248945. Of these, chiral compounds with large helical twisting power (HTP) are preferred in the polymerizable liquid crystal composition of the present invention. The amount of the polymerizable chiral compound needs to be appropriately adjusted on the basis of the helical twisting power of the compound and is preferably from 0 to 25 mass %, more preferably 0 to 20 mass %, and especially preferably 0 to 15 mass % in the polymerizable liquid crystal composition. Examples of general formulae that represent the polymerizable chiral compound include, but are not limited to, General Formulae (3-1) to (3-4).

[Chem. 33]

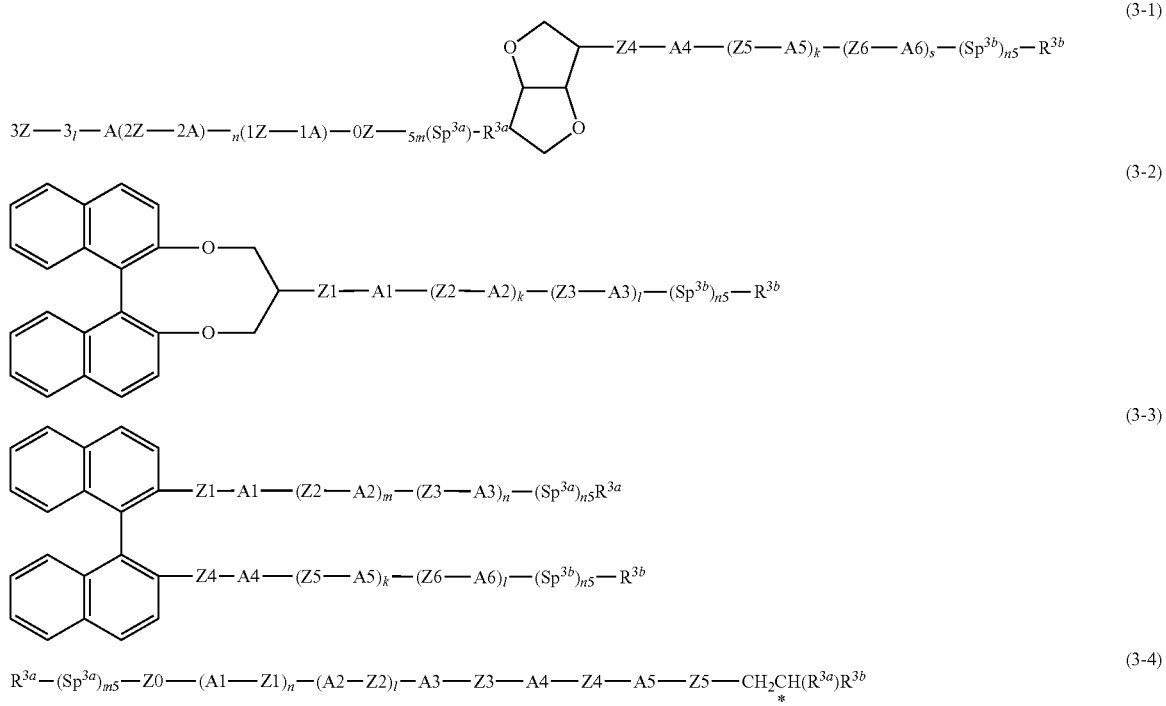

In the formulae, $Sp^{3a}$ and $Sp^{3b}$ each independently represent an alkylene group having 0 to 18 carbon atoms; the alkylene group is optionally substituted with at least one halogen atom, CN group, or alkyl group having 1 to 8 carbon atoms and a polymerizable functional group; one $CH_2$ group or two or more $CH_2$ groups not adjoining each other in the alkylene group are each independently optionally substituted with —O—, —S—, —NH—, —N(CH$_3$)—, —CO—, —COO—, —OCO—, —OCOO—, —SCO—, —COS—, or —C≡C— such that oxygen atoms are not directly bonded to each other;

A1, A2, A3, A4, and A5 each independently represent a 1,4-phenylene group, a 1,4-cyclohexylene group, a 1,4- cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronapthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2, 6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group; n, l, and k each independently represent 0 or 1 and give the relationship of 0≤n+l+k≤3; Z0, Z1, Z2, Z3, Z4, Z5, and Z6 each independently represent —COO—, —OCO—, —CH$_2$CH$_2$—, —OCH$_2$—, —CH$_2$O—, —CH═CH—, —C≡C—, —CH═CH COO—, —OCOCH═CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond;

n5 and m5 each independently represent 0 or 1;

$R^{3a}$ and $R^{3b}$ each represent a hydrogen atom, a halogen atom, a cyano group, or an alkyl group having 1 to 18 carbon atoms; the alkyl group is optionally substituted with at least one halogen atom or CN; one CH$_2$ group or two or more CH$_2$ groups not adjoining each other in the alkyl group are each independently optionally substituted with —O—, —S—, —NH—, —N(CH$_3$)—, —CO—, —COO—, —OCO—, —OCOO—, —SCO—, —COS—, or —C≡C-such that oxygen atoms are not directly bonded to each other;

alternatively, $R^{3a}$ and $R^{3b}$ are represented by General Formula (3-a)

[Chem. 34]

—P$^{3a}$      (3-a)

(in the formula, P$^{3a}$ represents a polymerizable functional group, and Sp$^{3a}$ has the same meaning as Sp$^1$)

P$^{3a}$ preferably represents a substituent selected from polymerizable groups represented by Formulae (P-1) to (P-20).

[Chem. 35]

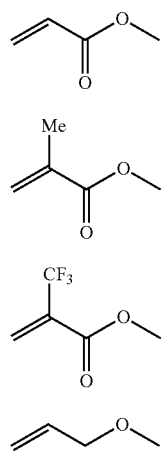

(P-1)

(P-2)

(P-3)

(P-4)

-continued

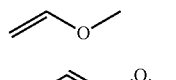 (P-5)

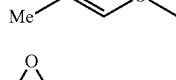 (P-6)

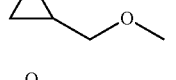 (P-7)

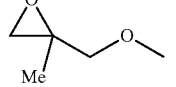 (P-8)

 (P-9)

 (P-10)

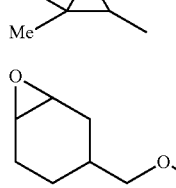 (P-11)

(P-12)

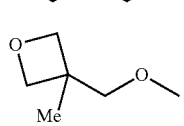 (P-13)

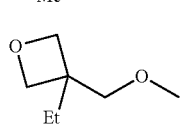 (P-14)

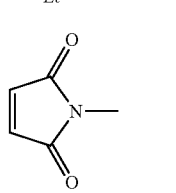 (P-15)

(P-16)

 (P-17)

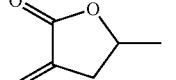 (P-18)

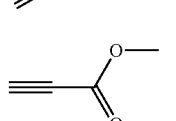 (P-19)

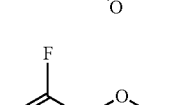

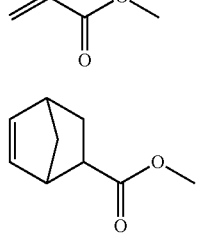

(P-20)
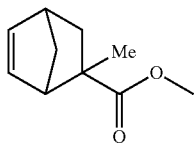
Of these polymerizable functional groups, the groups represented by Formula (P-1) and Formulae (P-2), (P-7), (P-12), and (P-13) are preferred in order to improve polymerizability and storage stability; and the groups represented by Formulae (P-1), (P-7), and (P-12) are more preferred.
Specific examples of the polymerizable chiral compound include, but are not limited to, compounds (3-5) to (3-25).
[Chem. 36]
(3-5)
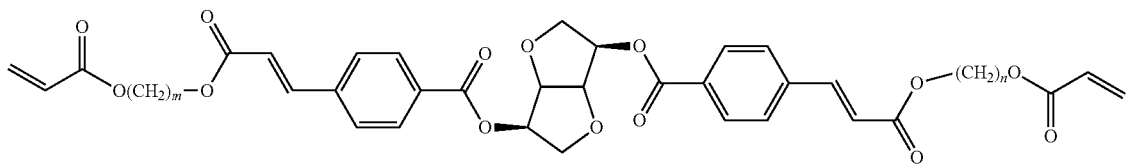
(3-6)
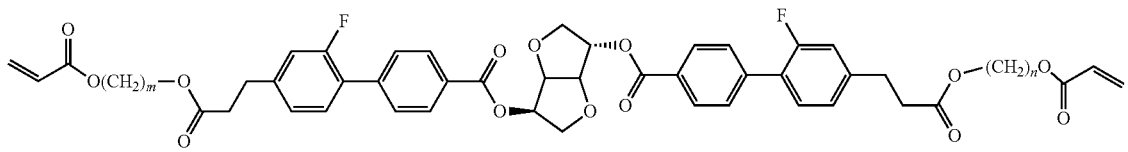
(3-7)
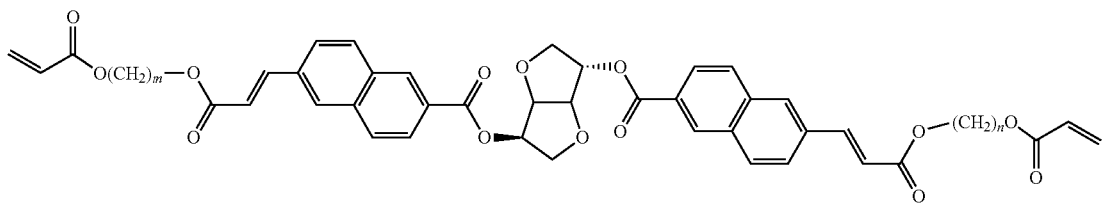
(3-8)
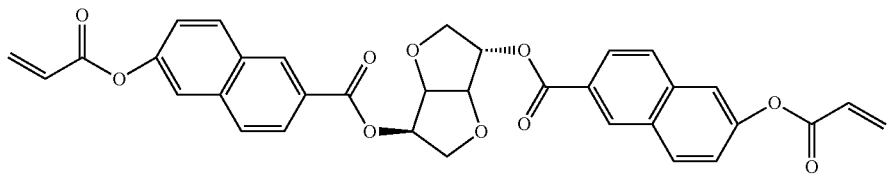
(3-9)
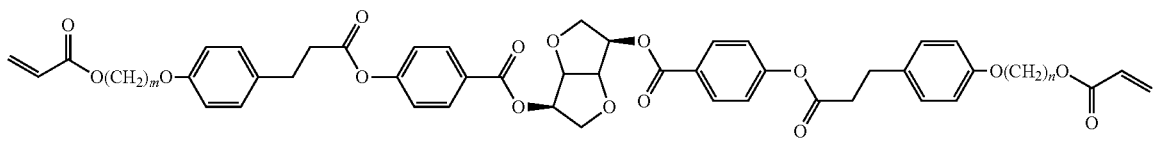
(3-10)
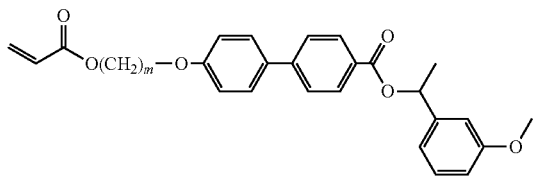
(3-11)
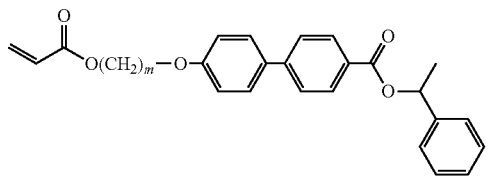

(3-12)
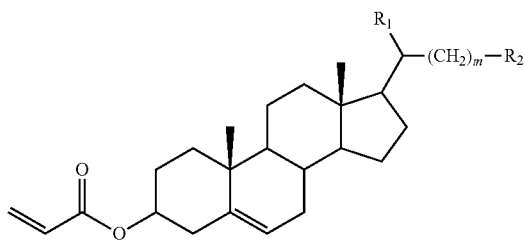
(3-13)
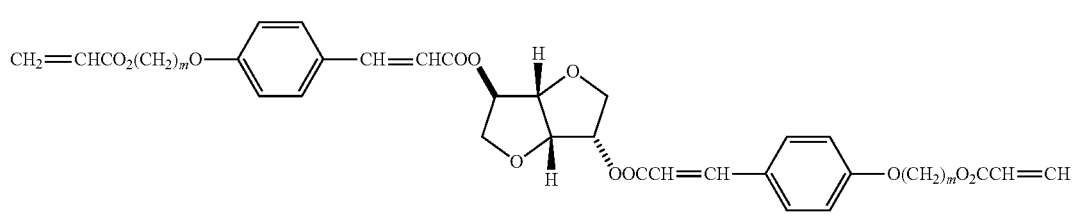
[Chem. 37]
(3-14)
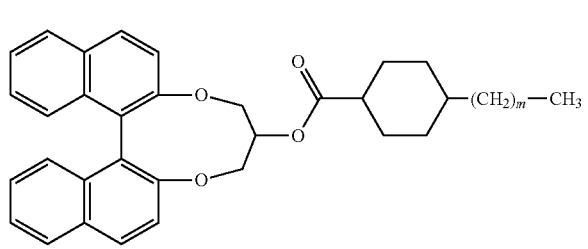
(3-15)
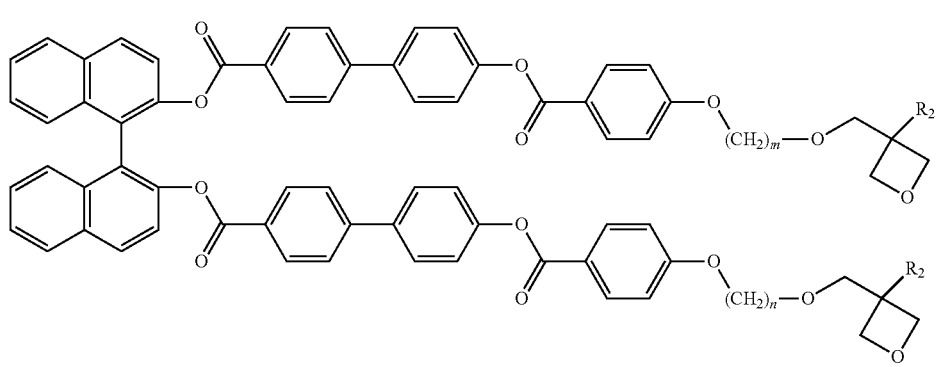
(3-16)
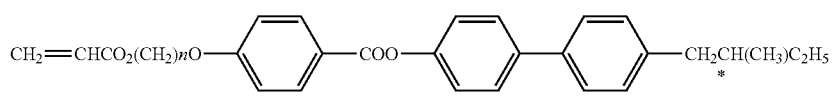
[Chem. 38]
(3-17)
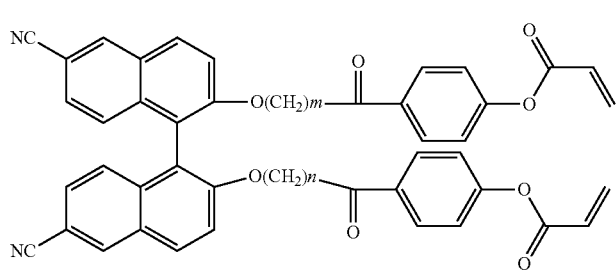

(3-18)
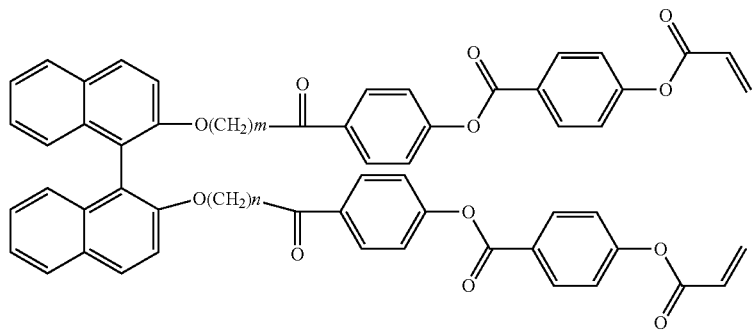
(3-19)
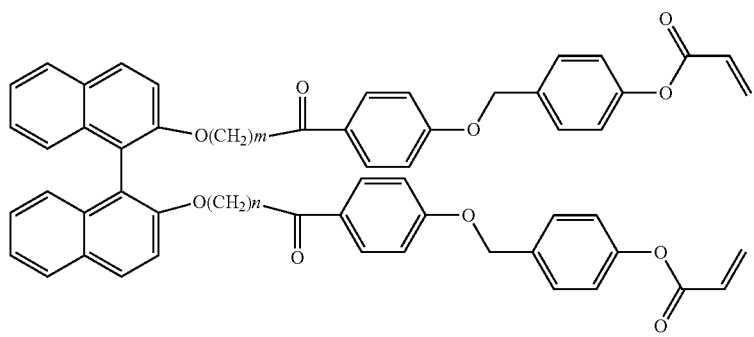
[Chem. 39]
(3-20) (3-21)
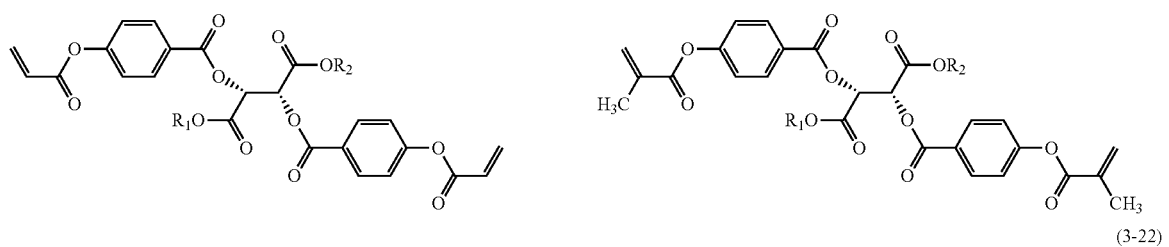
(3-22)
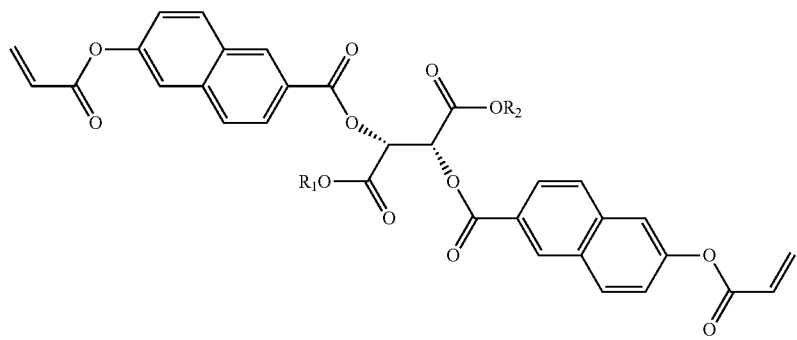
(3-23)
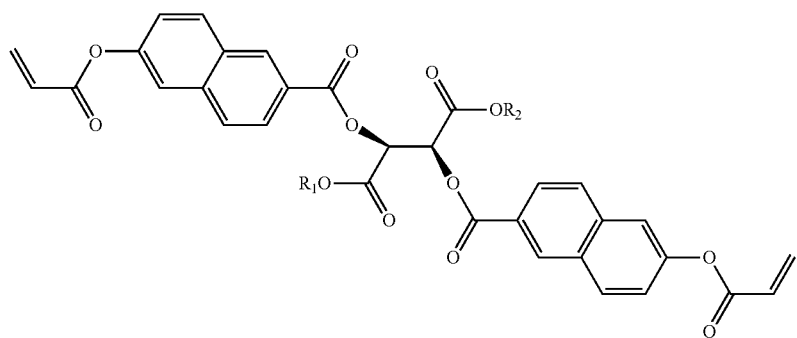

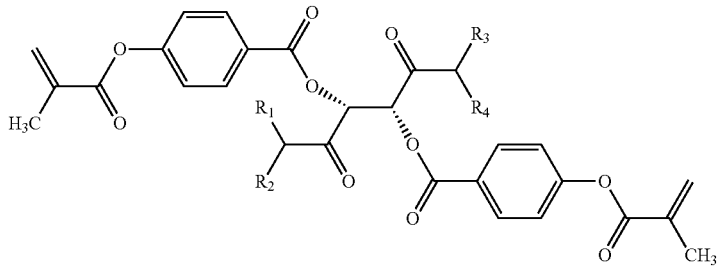

(3-24)

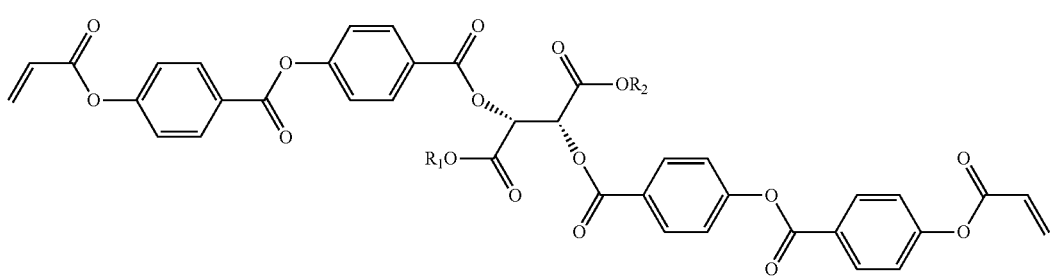

(3-25)

In the formulae, m, n, k, and l each independently represent an integer from 1 to 18; and $R_1$ to $R_4$ each independently represent a hydrogen atom, an alkyl group having 1 to 6 carbon atoms, an alkoxy group having 1 to 6 carbon atoms, a carboxyl group, or a cyano group. In the case where these groups are alkyl groups each having 1 to 6 carbon atoms or alkoxy groups each having 1 to 6 carbon atoms, each of them may have no substituent or may be substituted with one or more halogen atoms.

(Polymerizable Discotic Compound)

In addition to the polymerizable compound represented by General Formula (II), the polymerizable liquid crystal composition of the present invention can contain a polymerizable discotic compound that may be liquid crystalline or non-liquid crystalline.

The polymerizable discotic compound used in the present invention preferably has at least one polymerizable functional group. Examples of such a compound include polymerizable compounds disclosed in Japanese Unexamined Patent Application Publication Nos. 7-281028, 7-287120, 7-333431, and 8-27284.

The amount of the polymerizable discotic compound needs to be appropriately adjusted on the basis of the type of the compound and is preferably from 0 to 10 mass % in the polymerizable composition.

Examples of general formulae that represent the polymerizable discotic compound include, but are not limited to, General Formulae (4-1) to (4-3).

[Chem. 40]

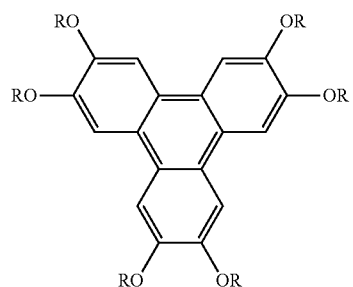

(4-1)

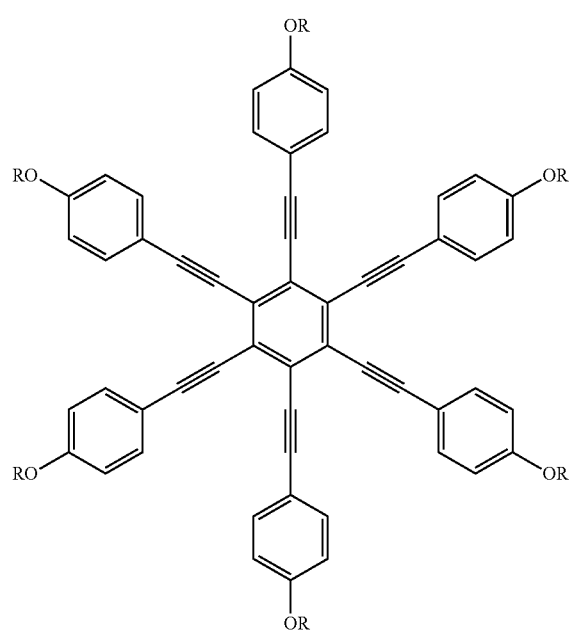

(4-2)

(4-3)

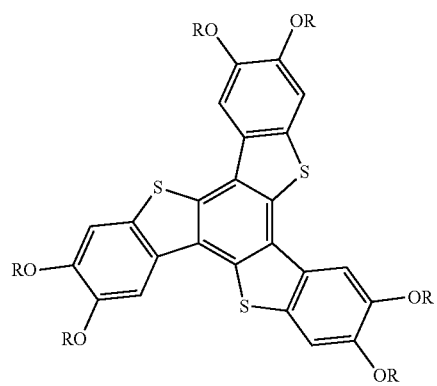

R: —Z$^{4a}$—(A$^4$—Z$^{4b}$)$_{n4}$—SP$^4$—R$^4$

In the formula, SP$^4$ represents an alkylene group having 0 to 18 carbon atoms; the alkylene group is optionally substituted with at least one halogen atom, CN group, or alkyl group having 1 to 8 carbon atoms and a polymerizable functional group; one CH$_2$ group or two or more CH$_2$ groups not adjoining each other in the alkylene group are each independently optionally substituted with —O—, —S—, —NH—, —N(CH$_3$)—, —CO—, —COO—, —OCO—, —OCOO—, —SCO—, —COS—, or —C≡C-such that oxygen atoms are not directly bonded to each other;

A$^4$ represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronapthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group;

n5 represents 0 or 1,

Z$^{4a}$ represents —CO—, —CH$_2$CH$_2$—, —CH$_2$O—, —CH=CH—, —CH=CHCOO—, —CH$_2$CH$_2$COO—, —CH$_2$CH$_2$OCO—, —COCH$_2$CH$_2$—, an alkyl group having 2 to 10 carbon atoms and optionally a halogen atom, or a single bond;

Z$^{4b}$ represents —COO—, —OCO—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, —OCOO—, an alkyl group having 2 to 10 carbon atoms and optionally a halogen atom, or a single bond;

R$^4$ represents a hydrogen atom, a halogen atom, a cyano group, and an alkyl group having 1 to 18 carbon atoms; the alkyl group is optionally substituted with at least one halogen atom or CN; one CH$_2$ group or two or more CH$_2$ groups not adjoining each other in the alkyl group are each independently optionally substituted with —O—, —S—, —NH—, —N(CH$_3$)—, —CO—, —COO—, —OCO—, —OCOO—, —SCO—, —COS—, or —C≡C-such that oxygen atoms are not directly bonded to each other; alternatively, R$^4$ is represented by General Formula (4-a)

[Chem. 41]

—P$^{4a}$ (4-a)

(in the formula, P$^{4a}$ represents a polymerizable functional group, and Sp$^{3a}$ has the same meaning as Sp$^1$)

P$^{4a}$ preferably represents a substituent selected from polymerizable groups represented by Formulae (P-1) to (P-20).

[Chem. 42]

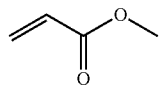 (P-1)

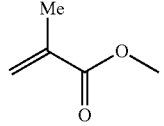 (P-2)

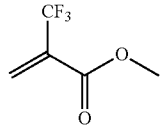 (P-3)

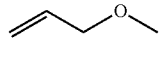 (P-4)

 (P-5)

 (P-6)

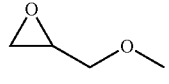 (P-7)

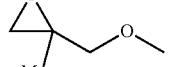 (P-8)

 (P-9)

 (P-10)

 (P-11)

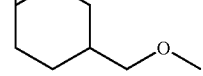 (P-12)

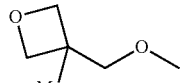 (P-13)

(P-14)

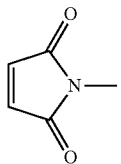

(P-15)

HS—

(P-16)

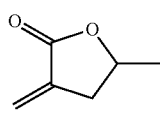

(P-17)

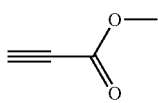

(P-18)

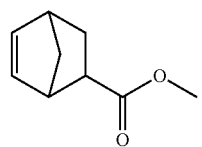

(P-19)

(P-20)

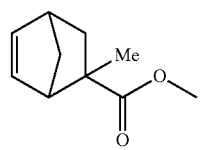

Of these polymerizable functional groups, the groups represented by Formula (P-1) and Formulae (P-2), (P-7), (P-12), and (P-13) are preferred in order to improve polymerizability and storage stability; and the groups represented by Formulae (P-1), (P-7), and (P-12) are more preferred.

Specific examples of the polymerizable discotic compound include, but are not limited to, compounds (4-4) to (4-8).

[Chem. 43]

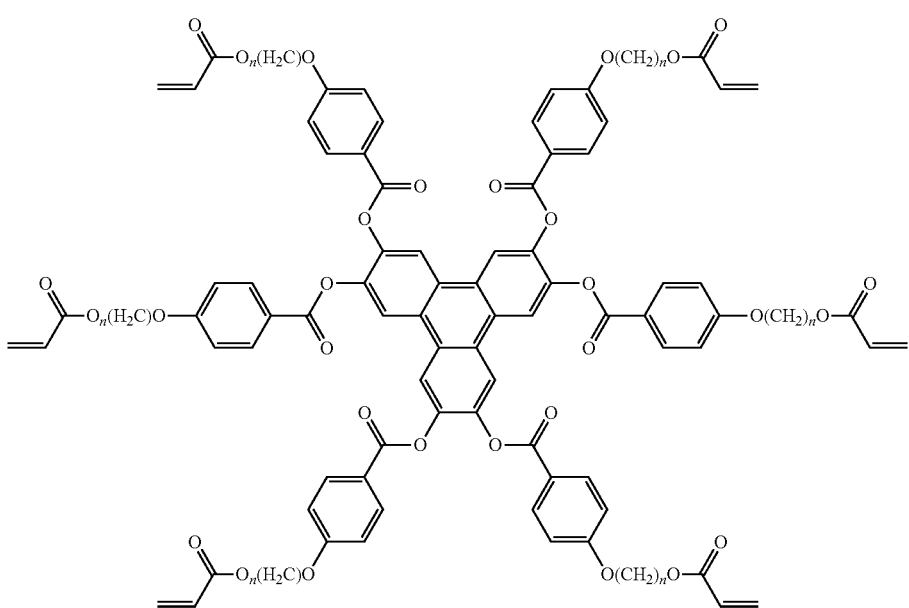

(4-4)

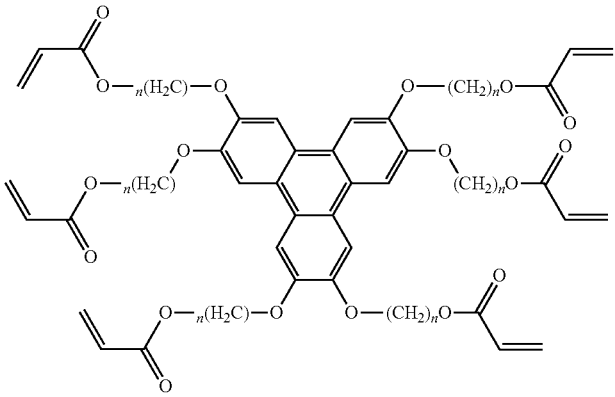
(4-5)
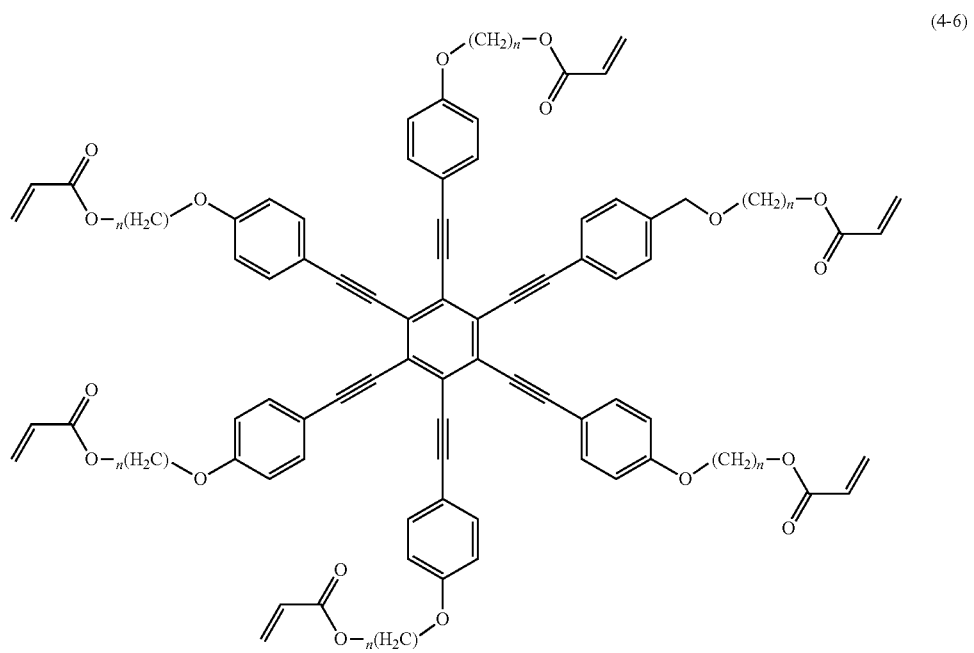
(4-6)
[Chem. 44]
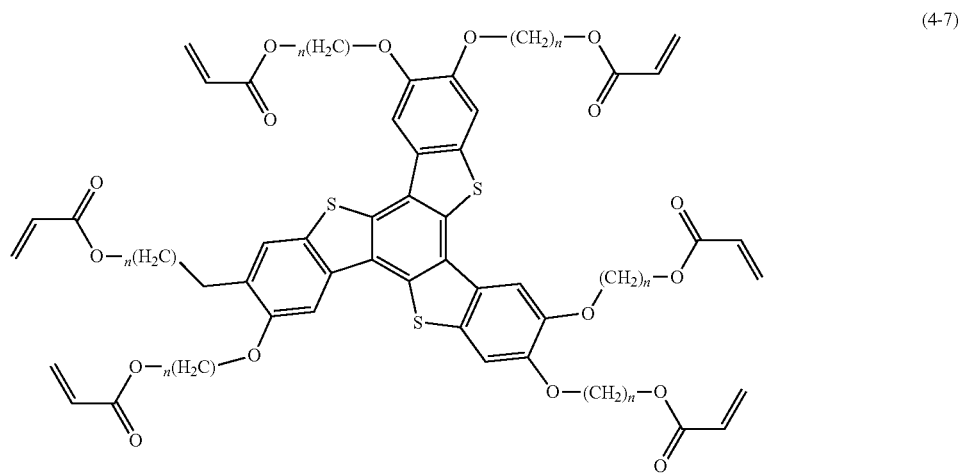
(4-7)

[Chem. 45]

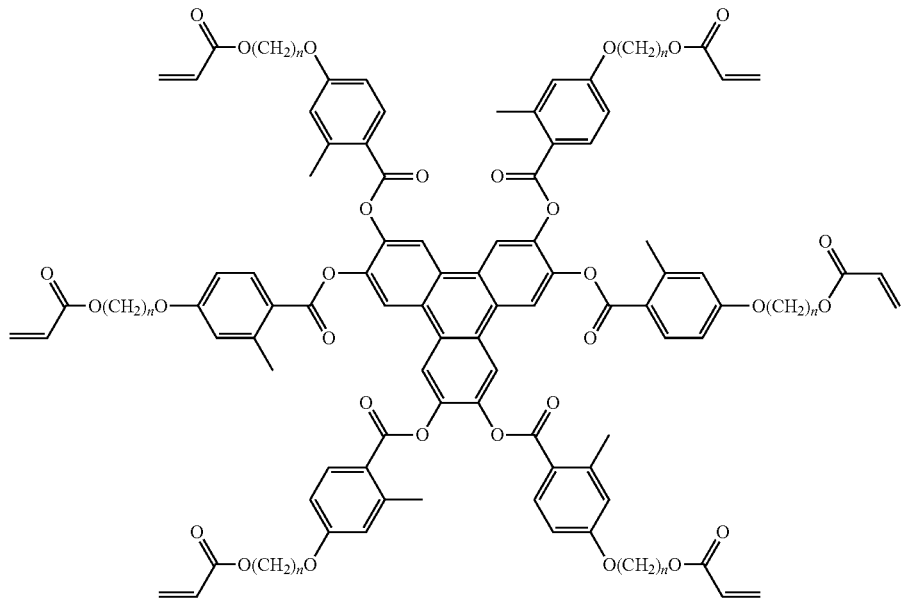

(4-8)

In the formulae, n represents an integer of 1 to 18.
(Organic Solvent)

The polymerizable liquid crystal composition of the present invention may contain an organic solvent. An organic solvent to be used is not particularly limited but preferably an organic solvent that dissolves polymerizable compounds well and that can be dried at not more than 100° C. Examples of such a solvent include aromatic hydrocarbons such as toluene, xylene, cumene, and mesitylene; ester solvents such as methyl acetate, ethyl acetate, propyl acetate, and butyl acetate; ketone solvents such as methyl ethyl ketone, methyl isobutyl ketone, cyclohexanone, and cyclopentanone; ether solvents such as tetrahydrofuran, 1,2-dimethoxyethane, and anisole; amide solvents such as N,N-dimethylformamide and N-methyl-2-pyrrolidone; and propylene glycol monomethyl ether acetate, diethylene glycol monomethyl ether acetate, γ-butyrolactone, and chlorobenzene. These may be used alone or in combination; at least one of ketone solvents, ether solvents, ester solvents, and aromatic hydrocarbon solvents is preferably used in terms of solution stability.

The composition used in the present invention can be applied to a substrate when it is in the form of a solution in the organic solvent. The proportion of the organic solvent used in the polymerizable liquid crystal composition is not particularly limited provided that the state of the coating is not significantly impaired; the total amount of organic solvents contained in the polymerizable liquid crystal composition is preferably in the range of 30 to 95 mass %, more preferably 40 to 90 mass %, and especially preferably 50 to 85 mass %.

In order to uniformly dissolve the polymerizable liquid crystal composition in the organic solvent, stirring under heating is preferably carried out. The temperature in the stirring under heating may be appropriately adjusted on the basis of the solubility of a composition, which is to be used, in the organic solvent; in terms of productivity, the temperature is preferably from 15° C. to 110° C., more preferably 15° C. to 105° C., further preferably 15° C. to 100° C., and especially preferably 20° C. to 90° C.

In a process for adding the solvent, agitation and mixing is preferably performed with a dispersing agitator. Specific examples of a usable dispersing agitator include a disper; a disperser having an agitating blade, such as a turbine blade or a propeller; a paint shaker; a planetary stirring machine; a shaking apparatus; a shaker; and a rotary evaporator. An ultrasonic radiation apparatus can be also used.

It is preferred that the rotational speed for the agitation in the process for adding the solvent be properly adjusted on the basis of the type of an agitator to be used. The rotational speed for the agitation is preferably from 10 rpm to 1000 rpm, more preferably 50 rpm to 800 rpm, and especially preferably 150 rpm to 600 rpm in order to produce a uniform solution of polymerizable liquid crystal composition.
(Polymerization Inhibitor)

The polymerizable liquid crystal composition of the present invention preferably contains a polymerization inhibitor. Examples of the polymerization inhibitor include phenolic compounds, quinone compounds, amine compounds, thioether compounds, and nitroso compounds.

Examples of the phenolic compounds include p-methoxyphenol, cresol, t-butyl catechol, 3,5-di-t-butyl-4-hydroxytoluene, 2.2'-methylenebis(4-methyl-6-t-butylphenol), 2.2'-methylenebis(4-ethyl-6-t-butylphenol), 4.4'-thiobis(3-methyl-6-t-butylphenol), 4-methoxy-1-naphthol, and 4,4'-dialkoxy-2,2'-bi-1-naphthol.

Examples of the quinone compounds include hydroquinone, methyl hydroquinone, tert-butyl hydroquinone, p-benzoquinone, methyl-p-benzoquinone, tert-butyl-p-benzoquinone, 2,5-diphenylbenzoquinone, 2-hydroxy-1,4-naphthoquinone, 1,4-naphthoquinone, 2,3-dichloro-1,4-naphthoquinone, anthraquinone, and diphenoquinone.

Examples of the amine compounds include p-phenylenediamine, 4-aminodiphenylamine, N.N'-diphenyl-p-phenylenediamine, N-i-propyl-N'-phenyl-p-phenylenediamine, N-(1.3-dimethylbutyl)-N'-phenyl-p-phenylenediamine, N.N'-di-2-naphthyl-p-phenylenediamine, diphenylamine, N-phenyl-3-naphthylamine, 4.4'-dicumyl-diphenylamine, and 4.4'-dioctyl-diphenylamine.

Examples of the thioether compounds include phenothiazine and distearyl thiodipropionate.

Examples of the nitroso compounds include N-nitrosodiphenylamine, N-nitrosophenylnaphthylamine, N-nitrosodinaphthylamine, p-nitrosophenol, nitrosobenzene, p-nitrosodiphenylamine, α-nitroso-β-naphthol, N,N-dimethyl p-nitrosoaniline, p-nitrosodiphenylamine, p-nitrondimethylamine, p-nitron-N,N-diethylamine, N-nitrosoethanolamine, N-nitrosodi-n-butylamine, N-nitroso-N-n-butyl-4-butanolamine, N-nitroso-diisopropanolamine, N-nitroso-N-ethyl-4-butanolamine, 5-nitroso-8-hydroxyquinoline, N-nitrosomorpholine, an N-nitroso-N-phenylhydroxylamine ammonium salt, nitrosobenzene, 2,4.6-tri-tert-butylnitronbenzene, N-nitroso-N-methyl-p-toluenesulfonamide, N-nitroso-N-ethylurethane, N-nitroso-N-n-propylurethane, 1-nitroso-2-naphthol, 2-nitroso-1-naphthol, sodium 1-nitroso-2-naphthol-3,6-sulfonate, sodium 2-nitroso-1-naphthol-4-sulfonate, 2-nitroso-5-methylaminophenol hydrochloride, and 2-nitroso-5-methylaminophenol hydrochloride.

The amount of the polymerization inhibitor is preferably in the range of 0.01 to 1.0 mass %, and more preferably 0.05 to 0.5 mass % relative to the polymerizable liquid crystal composition.

(Antioxidant)

In order to enhance the stability of the polymerizable liquid crystal composition of the present invention, an antioxidant or another material is preferably used. Examples of such a compound include hydroquinone derivatives, nitrosamine polymerization inhibitors, and hindered phenol antioxidants. Specific examples thereof include tert-butylhydroquinone; methylhydroquinone; "Q-1300" and "Q-1301" manufactured by Wako Pure Chemical Industries, Ltd.; and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", and "IRGANOX 565" manufactured by BASF SE.

The amount of the antioxidant is preferably from 0.01 to 2.0 mass %, and more preferably 0.05 to 1.0 mass % relative to the polymerizable liquid crystal composition.

(Photopolymerization Initiator)

The polymerizable liquid crystal composition of the present invention preferably contains a photopolymerization initiator. At least one photopolymerization initiator is preferably used. Specific Examples thereof include "Irgacure 651", "Irgacure 184", "Darocur 1173", "Irgacure 907", "Irgacure 127", "Irgacure 369", "Irgacure 379", "Irgacure 819", "Irgacure 2959", "Irgacure 1800", "Irgacure 250", "Irgacure 754", "Irgacure 784", "Irgacure OXE01", "Irgacure OXE02", "Lucirin TPO", "Darocur 1173", and "Darocur MBF" manufactured by BASF Japan Ltd.; "Esacure 1001M", "Esacure KIP150", "SpeedCure BEM", "SpeedCure BMS", "SpeedCure MBP", "SpeedCure PBZ", "SpeedCure ITX", "SpeedCure DETX", "SpeedCure EBD", "SpeedCure MBB", and "SpeedCure BP" manufactured by Lambson Limited; "KAYACURE DMBI" manufactured by Nippon Kayaku Co., Ltd.; "TAZ-A" manufactured by Nihon SiberHegner K.K. (current DKSH Japan K.K); and "ADEKA OPTOMER SP-152", "ADEKA OPTOMER SP-170", "ADEKA OPTOMER N-1414", "ADEKA OPTOMER N-1606", "ADEKA OPTOMER N-1717", and "ADEKA OPTOMER N-1919" manufactured by ADEKA CORPORATION.

The amount of the photopolymerization initiator to be used is preferably in the range of 0.1 to 10 mass %, and especially preferably 0.5 to 7 mass % relative to the polymerizable liquid crystal composition. The photopolymerization initiators may be used alone or in combination, and a sensitizer or another material may be additionally used.

(Thermal Polymerization Initiator)

In the polymerizable liquid crystal composition of the present invention, the photopolymerization initiator can be used in combination with a thermal polymerization initiator. Specific examples of the thermal polymerization initiator include "V-40" and "VF-096" manufactured by Wako Pure Chemical Industries, Ltd. and "PERHEXYL D" and "PERHEXYL I" manufactured by Nippon Oil & Fats Co., Ltd. (current NOF CORPORATION).

The amount of the thermal polymerization initiator to be used is preferably in the range of 0.1 to 10 mass %, and especially preferably 0.5 to 5 mass % relative to the polymerizable liquid crystal composition. The thermal polymerization initiators may be used alone or in combination.

(Surfactant)

The polymerizable liquid crystal composition of the present invention may contain at least one surfactant in order to reduce unevenness in the thickness of an optically anisotropic body formed thereof. Examples of usable surfactants include alkyl carboxylates, alkyl phosphates, alkyl sulfonates, fluoroalkyl carboxylates, fluoroalkyl phosphates, fluoroalkyl sulfonates, polyoxyethylene derivatives, fluoroalkyl ethylene oxide derivatives, polyethylene glycol derivatives, alkylammonium salts, and fluoroalkylammonium salts. In particular, fluorine-containing surfactants are preferred. Specific examples thereof include "MEGAFAC F-251", "MEGAFACF-444", "MEGAFAC F-477", "MEGAFAC F-510", "MEGAFAC F-552", "MEGAFAC F-553", "MEGAFAC F-554", "MEGAFAC F-555", "MEGAFACF-556", "MEGAFAC F-557", "MEGAFAC F-558", "MEGAFAC F-559", "MEGAFAC F-560", "MEGAFAC F-561", "MEGAFAC F-562", "MEGAFAC F-563", "MEGAFAC F-565", "MEGAFAC F-567", "MEGAFAC F-568", "MEGAFAC F-569", "MEGAFAC F-570", "MEGAFAC F-571", "MEGAFAC R-40", "MEGAFAC R-41", "MEGAFAC R-43", "MEGAFAC R-94", "MEGAFAC RS-72-K", "MEGAFAC RS-75", "MEGAFAC RS-76-E", and "MEGAFAC RS-90" (each manufactured by DIC Corporation); "Ftergent 100", "Ftergent 100C", "Ftergent 110", "Ftergent 150", "Ftergent 150CH", "Ftergent A", "Ftergent 100A-K", "Ftergent 501", "Ftergent 300", "Ftergent 310", "Ftergent 320", "Ftergent 400SW", "FTX-400P", "Ftergent 251", "Ftergent 215M", "Ftergent 212 MH", "Ftergent 250", "Ftergent 222F", "Ftergent 212D", "FTX-218", "FTX-209F", "FTX-213F", "FTX-233F", "Ftergent 24SF", "FTX-208G", "FTX-240G", "FTX-260D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730LS", "FTX-730LM", "FTX-730LL", and "FTX-710LL" (each manufactured by NEOS COMPANY LIMITED); "BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-Silclean 3700" (each manufactured by BYK Japan KK);

"TEGO Rad 2100", "TEGO Rad 2200N", "TEGO Rad 2250", "TEGO Rad 2300", "TEGO Rad 2500", "TEGO Rad 2600", and "TEGO Rad 2700" (each manufactured by Evonik Tego Chemie); and "N215", "N535", "N605K", and "N935" (each manufactured by Solvay Solexis).

The amount of the surfactant is preferably from 0.01 to 2 mass %, and more preferably 0.05 to 0.5 mass % relative to the polymerizable composition.

Use of the above-mentioned surfactant enables an optically anisotropic body formed of the polymerizable liquid crystal composition of the present invention to have an effectively reduced tilt angle at the air interface and also enables good orientation. Surprisingly, combined use of the surfactant with the above-mentioned polymerizable haze-reducing agent generates a synergistic effect to significantly improve orientation.

Besides the above-mentioned surfactants, examples of usable surfactants in the polymerizable liquid crystal composition of the present invention include compounds each having a repeating unit represented by General Formula (7) and a weight average molecular weight of not less than 100.

[Chem. 46]

(7)

In the formula, $R^{11}$, $R^{12}$, $R^{13}$, and $R^{14}$ each independently represent a hydrogen atom, a halogen atom, or a hydrocarbon group having 1 to 20 carbon atoms; in the hydrocarbon group, a hydrogen atom is optionally substituted with at least one halogen atom.

Examples of preferred compounds represented by General Formula (7) include polyethylene, polypropylene, polyisobutylene, paraffin, liquid paraffin, chlorinated polypropylene, chlorinated paraffin, and chlorinated liquid paraffin.

The amount of the compound represented by General Formula (7) is preferably in the range of 0.01 to 1 mass %, and more preferably 0.05 to 0.5 mass % relative to the polymerizable liquid crystal composition.

Using the compound represented by General Formula (7) as a surfactant also enables an optically anisotropic body formed of the polymerizable liquid crystal composition to have a good orientation. Using a polymerizable haze-reducing agent in combination with the compound represented by General Formula (7) generates a synergistic effect to significantly improve orientation as in the above-mentioned case.

(Chain-Transfer Agent)

The polymerizable liquid crystal composition of the present invention also preferably contains a chain-transfer agent in order to enhance the adhesion of an optically anisotropic body formed thereof to a substrate. Preferred chain-transfer agents are thiol compounds; monothiol, dithiol, trithiol, and tetrathiol compounds are more preferred; and trithiol compounds are further preferred. Specifically, compounds represented by General Formula (8-1) to (8-12) are preferred.

[Chem. 47]

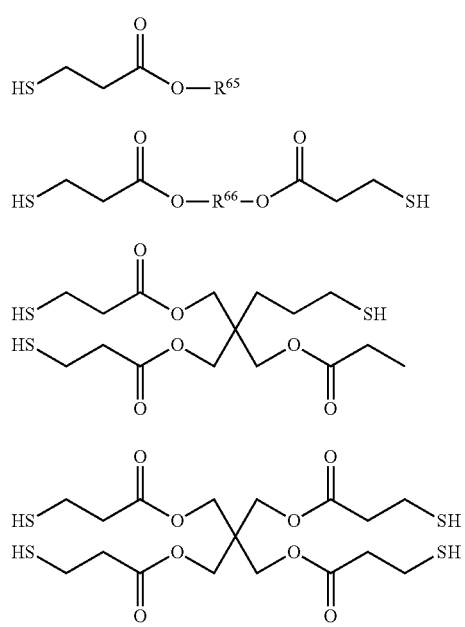

[Chem. 48]

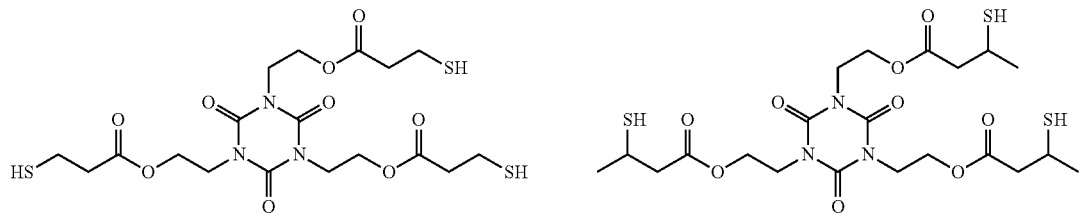

-continued

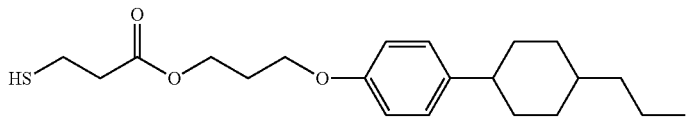

(8-11)

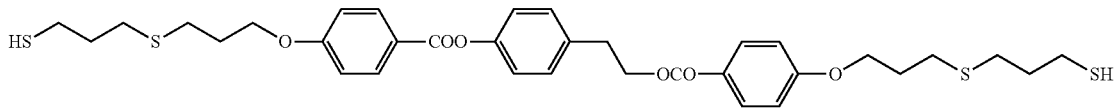

(8-12)

In the formulae, $R^{65}$ represents an alkyl group having 2 to 18 carbon atoms; the alkyl group may be linear or branched; at least one methylene group in the alkyl group is optionally substituted with an oxygen atom, a sulfur atom, —CO—, —OCO—, —COO—, or —CH═CH— provided that oxygen atoms or sulfur atoms are not directly bonded to each other; $R^{66}$ represents an alkylene group having 2 to 18 carbon atoms; and at least one methylene group in the alkylene group is optionally substituted with an oxygen atom, a sulfur atom, —CO—, —OCO—, —COO—, or —CH═CH— provided that oxygen atoms or sulfur atoms are not directly bonded to each other.

The amount of the chain-transfer agent is preferably in the range of 0.5 to 10 mass %, and more preferably 1.0 to 5.0 mass % relative to the polymerizable liquid crystal composition.

(Other Additives)

In order to adjust physical properties, additives such as a polymerizable compound having no liquid crystallinity, a thixotropic agent, an ultraviolet absorber, an infrared absorber, an oxidation inhibitor, and a surface preparation agent can be used on the basis of the intended use to such an extent that the orientation of liquid crystal is not greatly impaired.

(Method for Producing Optically Anisotropic Body)
(Optically Anisotropic Body)

An optically anisotropic body produced by using the polymerizable liquid crystal composition of the present invention has a layered structure including a substrate, an alignment film optionally formed, and the polymer of the polymerizable liquid crystal composition in sequence.

(Substrate)

Any substrate can be used in the optically anisotropic body of the present invention provided that the substrate can be used in general liquid crystal devices, displays, optical components, and optical films and that the substrate has a heat resistance that allows it to endure heating for drying after application of the polymerizable liquid crystal composition of the present invention. Examples of such a substrate include glass substrates, metal substrates, ceramic substrates, and substrates formed of organic materials, such as plastic substrates. Especially in the case where the substrate is formed of an organic material, examples of the organic material include cellulose derivatives, polyolefin, polyester, polycarbonate, polyacrylate (acrylic resin), polyarylate, polyether sulphone, polyimide, polyphenylene sulfide, polyphenylene ether, nylon, and polystyrene. In particular, plastic substrates formed of polyester, polystyrene, polyacrylate, polyolefin, cellulose derivatives, polyarylate, and polycarbonate are preferred; substrates formed of polyacrylate, polyolefin, and cellulose derivatives are more preferred; and using COP (cycloolefin polymer) as polyolefin, TAC (triacetylcellulose) as a cellulose derivative, and PMMA (polymethyl methacrylate) as polyacrylate is especially preferred. The substrate may have a planar shape or a curved surface. Such a substrate may optionally have an electrode layer, an antireflection function, or a reflection function.

The substrate may be subjected to a surface treatment in order to enable the polymerizable liquid crystal composition of the present invention to be applied and adhere thereto well. Examples of the surface treatment include an ozone treatment, a plasma treatment, a corona treatment, and a silane coupling treatment. The surface of the substrate may be provided with, for example, an organic thin film, an inorganic oxide thin film, a metal thin film by deposition or another technique in order to adjust the transmittance or reflectance of light. Alternatively, the substrate may be, for instance, a pickup lens, a rod lens, an optical disc, a retardation film, a light diffusing film, or a color filter in order to give an optical value. In particular, a pickup lens, a retardation film, a light diffusing film, and a color filter are preferred because they can give a higher optical value.

(Alignment Treatment)

The substrate may be typically subjected to an alignment treatment or may be provided with an alignment film in order to align the polymerizable liquid crystal composition after the polymerizable liquid crystal composition of the present invention is applied and dried. Examples of the alignment treatment include a stretching treatment, a rubbing treatment, a treatment with radiation of polarized ultraviolet and visible light, and an ion beam treatment. In the case where an alignment film is used, any of known alignment films can be employed. Examples of such alignment films include those formed of compounds, such as polyimide, polysiloxane, polyamide, polyvinyl alcohol, polycarbonate, polystyrene, polyphenylene ether, polyarylate, polyethylene terephthalate, polyether sulfone, epoxy resins, epoxyacrylate resins, acrylic resins, coumarin compounds, chalcone compounds, cinnamate compounds, fulgide compounds, anthraquinone compounds, azo compounds, and arylethene compounds. A compound that is to be rubbed for the alignment treatment is preferably a compound of which the crystallization of the material is promoted by the alignment treatment itself or heating after the alignment treatment. Among compounds that are to be subjected to the alignment treatment other than the rubbing, photo-aligned materials are preferably used.

(Application)

An application technique for producing the optically anisotropic body of the present invention can be any of known techniques such as a method involving use of an applicator, a bar coating method, a spin coating method, a roll coating method, a direct gravure coating method, a reverse gravure coating method, a flexographic coating method, an inkjet method, a die coating method, a cap coating method, a dip coating method, and a slit coating method. The polymerizable liquid crystal composition is appropriately dried after being applied.

(Polymerization Process)

The polymerization of the polymerizable liquid crystal composition of the present invention typically involves irradiation with light, such as ultraviolet, or heating in a state in which the liquid crystal compound contained in the polymerizable liquid crystal composition is in horizontal alignment, vertical alignment, hybrid alignment, or cholesteric alignment (planar alignment) with respect to the substrate. Specifically, in the polymerization involving irradiation with light, irradiation with ultraviolet rays having a wavelength of 390 nm or less is preferred, and irradiation with light having a wavelength ranging from 250 to 370 nm is most preferred. If the ultraviolet rays having a wavelength of 390 nm or less causes, for example, decomposition of the polymerizable composition, polymerization involving irradiation with ultraviolet rays having a wavelength of 390 nm or more is suitable in some cases. This light is preferably non-polarized diffused light.

(Polymerization Technique)

The polymerizable liquid crystal composition of the present invention can be polymerized by irradiation with active energy rays or heating. The irradiation with active energy rays is preferred because it is free from a heating step and enables the reaction to progress at room temperature; in particular, irradiation with light such as ultraviolet is preferred because it can be easily performed.

The temperature in the irradiation procedure is controlled so that the polymerizable liquid crystal composition of the present invention can maintain a liquid crystal phase; in order to prevent the occurrence of thermal polymerization of the polymerizable liquid crystal composition, it is preferred that the temperature be adjusted to be 30° C. or less as much as possible. Liquid crystal compositions are generally in a liquid crystal phase in the temperature range of C (solid phase) to N (nematic) transition temperature (hereinafter referred to as C—N transition temperature) to N—I transition temperature in a heating process. In a cooling process, liquid crystal compositions are in a thermodynamically non-equilibrium state; thus, they are not coagulated and maintain a state of liquid crystal in some cases even at a temperature of C—N transition temperature or lower. This state is called supercooled state. In the present invention, a liquid crystal composition in a supercooled state is also regarded as a liquid crystal phase being maintained. Specifically, irradiation with ultraviolet rays having a wavelength of 390 nm or less is preferred, and irradiation with light having a wavelength ranging from 250 to 370 nm is most preferred. If the ultraviolet rays having a wavelength of 390 nm or less causes, for example, decomposition of the polymerizable composition, polymerization involving irradiation with ultraviolet rays having a wavelength of 390 nm or more is suitable in some cases. The light is preferably non-polarized diffused light. The intensity of ultraviolet radiation is preferably in the range of 0.05 kW/m$^2$ to 10 kW/m$^2$, and especially preferably 0.2 kW/m$^2$ to 2 kW/m$^2$. At an intensity of less than 0.05 kW/m$^2$, the polymerization procedure takes a lot of time to be completed. At an intensity of greater than 2 kW/m$^2$, the liquid crystal molecules in the polymerizable liquid crystal composition are likely to undergo photolysis, and heat of polymerization is greatly generated to increase the temperature in the polymerization procedure, which causes a change in the order parameter of polymerizable liquid crystal with the result that the retardation of a film may be out of order after the polymerization.

An optically anisotropic body having regions with different directions of alignment can be produced as follows: only the intended part is irradiated with ultraviolet rays with a mask to be polymerized, the alignment state of the non-polymerized part is subsequently changed by application of an electric field or magnetic field or by a change in temperature, and then this non-polymerized part is polymerized.

An optically anisotropic body having regions with different directions of alignment can be produced also as follows: the polymerizable liquid crystal composition that has not been polymerized yet is subjected to application of an electric field or magnetic field or a change in temperature in advance to regulate an alignment state before only the intended part is irradiated with ultraviolet rays with a mask to be polymerized, and then polymerization is performed in this state by irradiation with light with a mask.

The optically anisotropic body produced through polymerization of the polymerizable liquid crystal composition of the present invention can be removed from the substrate and used in this state or can be used without being removed from the substrate. In particular, the optically anisotropic body is less likely to contaminate other members and therefore useful as a substrate on which a layer is to be formed or useful for being attached to another substrate.

(Retardation Film)

The retardation film of the present invention is produced as in the production of the optically anisotropic body of the present invention. In the case where a polymerizable compound represented by General Formula (1) in the polymerizable composition is polymerized in a state of planar alignment, a retardation film to be produced has in-plane birefringence with respect to the substrate. This retardation film can be used as a homogeneous liquid crystal film. In the case where the polymerizable compound represented by General Formula (1) in the polymerizable composition and the polymerizable chiral compound are polymerized in a state of planar alignment, a retardation film to be produced has out-of-plane birefringence with respect to the substrate. In the case where the polymerizable compound represented by General Formula (1) in the polymerizable composition containing a polymerizable discotic compound is polymerized in a state of planar alignment, a retardation film to be produced has both in-plane and out-of-plane birefringence with respect to the substrate.

In the case where the substrate has a phase difference, a retardation film to be produced has birefringence resulting from the combination of the birefringence of the substrate and the birefringence of the retardation film of the present invention. In the retardation film, the birefringence of the substrate and the birefringence of the retardation film may be in the same direction or in different directions in the plane of the substrate. The retardation film is used in the form suitable for applications such as liquid crystal devices, displays, optical devices, optical components, colorants, security marking, laser-emitting members, optical films, and compensation films.

(Patterned Retardation Film)

The patterned retardation film of the present invention is a laminate including a substrate, an alignment film, and a polymer of the polymerizable composition solution in sequence as in the optically anisotropic body of the present invention. The patterned retardation film is a film patterned so as to have partially-different phase difference in the polymerization process. The pattern may be in the form of a line, lattice, circle, or polygon and may be in different directions. The patterned retardation film is used on the basis of applications such as liquid crystal devices, displays, optical devices, optical components, colorants, security marking, laser-emitting members, optical films, and compensation films.

In order to produce partially-different phase difference, an alignment film is provided on a substrate, and the polymerizable composition is subjected to alignment in a pattern after the polymerizable composition solution of the present invention is applied and dried. Examples of the alignment treatment include fine rubbing, irradiation with polarized ultraviolet and visible light with a photomask, and processing in a fine shape. The alignment film to be used can be any of known alignment films. Examples of the alignment film include those formed of compounds, such as polyimide, polysiloxane, polyamide, polyvinyl alcohol, polycarbonate, polystyrene, polyphenylene ether, polyarylate, polyethylene terephthalate, polyether sulfone, epoxy resins, epoxyacrylate resins, acrylic resins, coumarin compounds, chalcone compounds, cinnamate compounds, fulgide compounds, anthraquinone compounds, azo compounds, and arylethene compounds. A compound that is to be subjected to fine rubbing for the alignment treatment is preferably a compound of which the crystallization of the material is promoted by the alignment treatment itself or heating after the alignment treatment. Among compounds that are to be subjected to the alignment treatment other than the rubbing, photo-aligned materials are preferably used.

EXAMPLES

The present invention will now be described with reference to Synthesis Examples, Examples, and Comparative Examples but is apparently not limited thereto. The terms "part" and "%" are on a mass basis unless otherwise specified.

(Preparation of Polymerizable Liquid Crystal Composition)

Compounds were selected from compounds shown in Table 1 and represented by Formulae (A-1) to (A-6), (B-1) to (B-6), and (C-1) in the total amount of 100 parts by mass; and the selected compounds were mixed with any of compounds represented by Formulae (D-1) to (D-9), a compound (E-1), a compound (F-1), and any of compounds (G-1) to (G-3) in the amounts shown in Table 1 (parts by mass). Toluene (H-1) was used as an organic solvent such that the total amount of the compounds selected from the compounds represented by Formulae (A-1) to (A-3), (B-1) to (B-6), and (C-1); the compound selected from the compounds represented by Formulae (D-1) to (D-9); the compound (E-1); the compound (F-1); and the compound selected from the compounds represented by Formulae (G-1) to (G-3) was 25 mass % in a polymerizable liquid crystal composition, thereby preparing a polymerizable liquid crystal composition (toluene: 75 mass %).

(Preparation of Polymerizable Liquid Crystal Composition (1))

As shown in Table 1, 40 parts by mass of the compound represented by Formula (A-1), 40 parts by mass of the compound represented by Formula (A-2), 10 parts by mass of the compound represented by Formula (B-1), and 10 parts by mass of the compound represented by Formula (B-2) were prepared; and 5 parts by mass of the compound represented by Formula (D-1), 5 parts by mass of a polymerization initiator (E-1), 0.1 part by mass of methylhydroquinone (MEHQ) (F-1), and 0.2 parts by mass of liquid paraffin (G-1) (molecular weight: 750) relative to 100 parts by mass of the total amount of the above compounds were prepared. The toluene (H-1) was used as an organic solvent such that the total amount of all of those compounds was 25 mass %. This mixture was stirred with a stirrer having a stirring propeller for an hour at a stirring rate of 500 rpm and a solution temperature of 80° C. The resulting product was then filtrated through a membrane filter of 0.2 μm to produce a polymerizable liquid crystal composition (1).

(Preparation of Polymerizable Liquid Crystal Compositions (2) to (24) and (32) to (39) and Comparative Polymerizable Liquid Crystal Compositions (25) to (31))

The compounds represented by Formulae (A-1) to (A-6), compounds represented by Formulae (B-1) to (B-6), compound represented by Formula (C-1), compounds represented by Formulae (D-1) to (D-9), polymerization initiator (E-1), polymerization inhibitor (F-1), liquid paraffin (G-1), surfactant (G-2), and surfactant (G-3), which are all shown in Tables 1 to 3, were used as shown in Table 1. Except for this change, polymerizable liquid crystal compositions (2) to (24) and (32) to (39) and comparative polymerizable liquid crystal compositions (25) to (31) were produced as in the preparation of the polymerizable liquid crystal composition (1) of the present invention.

Tables 1 to 3 show the specific constitution of the polymerizable liquid crystal compositions (1) to (24) and (32) to (39) of the present invention and the specific constitution of the comparative polymerizable liquid crystal compositions (25) to (31).

TABLE 1

| Composition | (1) | (2) | (3) | (4) | (5) | (6) | (7) | (8) | (9) | (10) | (11) | (12) | (13) |
|---|---|---|---|---|---|---|---|---|---|---|---|---|---|
| (A-1) | 35 | 35 | 35 | 35 | 35 | 35 | 35 | 35 | 10 | 35 | 35 | 35 | 35 |
| (A-2) | 35 | 35 | 35 | 35 | 35 | 35 | 35 | 35 | 10 | 35 | 35 | 35 | 35 |
| (A-3) | | | | | | | | | | | | | |
| (B-1) | 15 | 15 | 15 | 15 | 15 | 15 | 15 | 15 | 40 | 15 | 14 | 15 | 15 |
| (B-2) | 15 | 15 | 15 | 15 | 15 | 15 | 15 | 15 | 40 | 15 | 14 | 15 | 15 |
| (B-3) | | | | | | | | | | | | | |
| (B-4) | | | | | | | | | | | | | |
| (B-5) | | | | | | | | | | | | | |
| (B-6) | | | | | | | | | | | | | |
| (C-1) | | | | | | | | | | | | 2 | |
| (D-1) | 5 | 8 | 10 | 15 | | | | | | 6 | 1 | 8 | |
| (D-2) | | | | | 5 | 8 | | | | | | | |
| (D-3) | | | | | | | 8 | | | | | | |
| (D-4) | | | | | | | | 8 | | | | | |
| (D-5) | | | | | | | | | | | | | |
| (D-6) | | | | | | | | | | | | | 8 |
| (D-7) | | | | | | | | | | | | | 8 |
| (D-8) | | | | | | | | | | | | | |

TABLE 1-continued

| Composition | (1) | (2) | (3) | (4) | (5) | (6) | (7) | (8) | (9) | (10) | (11) | (12) | (13) |
|---|---|---|---|---|---|---|---|---|---|---|---|---|---|
| (D-9) | | | | | | | | | | | | | |
| (E-1) | 5 | 5 | 5 | 5 | 5 | 5 | 5 | 5 | 5 | 5 | 5 | 5 | 5 |
| (F-1) | 0.1 | 0.1 | 0.1 | 0.1 | 0.1 | 0.1 | 0.1 | 0.1 | 0.1 | 0.1 | 0.1 | 0.1 | 0.1 |
| (G-1) | 0.2 | 0.2 | 0.2 | 0.2 | 0.2 | 0.2 | 0.2 | 0.2 | 0.2 | 0.2 | 0.2 | 0.2 | 0.2 |
| (H-1) | 75 | 75 | 75 | 75 | 75 | 75 | 75 | 75 | 75 | 75 | 75 | 75 | 75 |

TABLE 2

| Composition | (14) | (15) | (16) | (17) | (18) | (19) | (20) | (21) | (22) | (23) | (24) |
|---|---|---|---|---|---|---|---|---|---|---|---|
| (A-1) | 20 | 10 | 20 | 10 | 20 | 10 | 10 | 20 | 40 | 40 | 40 |
| (A-2) | | | | | | | | | | | |
| (A-3) | 20 | 3 | 20 | 3 | 20 | 3 | 3 | 20 | 10 | 8 | 10 |
| (B-1) | | | | | | | | | | | |
| (B-2) | | | | | | | | | | | |
| (B-3) | 25 | | 25 | | 25 | | | 25 | 25 | 25 | 25 |
| (B-4) | | | | | | | | | 25 | 25 | 25 |
| (B-5) | 35 | 5 | 35 | 5 | 35 | 5 | 5 | 35 | | | |
| (B-6) | | 80 | | 80 | | 80 | 80 | | | | |
| (C-1) | | 2 | | 2 | | 2 | 2 | | | 2 | |
| (D-1) | | | | | | | | 8 | 8 | 5 | 8 |
| (D-2) | | | | | | | | | | | |
| (D-3) | | | | | | | | | | | |
| (D-4) | | | | | | | | | | | |
| (D-5) | | | | | | | | | | | |
| (D-6) | | | | | | | | | | | |
| (D-7) | | | | | 8 | 8 | | | | | |
| (D-8) | 8 | 8 | | | | | | | | | 5 |
| (D-9) | | | 8 | 8 | | | | | | | |
| (E-1) | 5 | 5 | 5 | 5 | 5 | 5 | 5 | 5 | 5 | 5 | 5 |
| (F-1) | 0.1 | 0.1 | 0.1 | 0.1 | 0.1 | 0.1 | 0.1 | 0.1 | 0.1 | 0.1 | 0.1 |
| (G-1) | 0.2 | 0.2 | 0.2 | 0.2 | 0.2 | 0.2 | 0.2 | 0.2 | 0.2 | 0.2 | 0.2 |
| (H-1) | 75 | 75 | 75 | 75 | 75 | 75 | 75 | 75 | 75 | 75 | 75 |

TABLE 3

| Composition | (25) | (26) | (27) | (28) | (20) | (30) | (31) | (32) | (33) | (34) | (35) | (36) | (37) | (38) | (39) |
|---|---|---|---|---|---|---|---|---|---|---|---|---|---|---|---|
| (A-1) | 35 | 35 | 20 | 20 | 40 | 10 | 40 | 35 | 35 | 25 | | 25 | 25 | 25 | |
| (A-2) | 35 | 35 | | | | | | 35 | 35 | 25 | 40 | | 25 | 25 | 25 |
| (A-3) | | | 20 | 20 | 10 | 3 | 10 | | | | 10 | | | | |
| (A-4) | | | | | | | | | | | 10 | | | | |
| (A-5) | | | | | | | | | | 10 | 25 | 20 | 10 | 10 | 10 |
| (A-6) | | | | | | | | 30 | 30 | 20 | 25 | 40 | 20 | 20 | 20 |
| (B-1) | 15 | 15 | | | | | | | | 10 | | 20 | 10 | 10 | 10 |
| (B-2) | 15 | 15 | | | | | | | | 10 | | 20 | 10 | 10 | 10 |
| (B-3) | | | 25 | 25 | 25 | | 25 | | | | | | | | |
| (B-4) | | | | | 25 | | 25 | | | | | | | | |
| (B-5) | | | 35 | 35 | | 5 | | | | | | | | | |
| (B-6) | | | | | | 80 | | | | | | | | | |
| (C-1) | | | | | | 2 | | | | | | | | | |
| (D-1) | | | | | | | | 5 | 8 | 5 | 5 | 5 | 5 | 5 | 5 |
| (D-2) | | | | | | | | | | | | | | | |
| (D-3) | | | | | | | | | | | | | | | |
| (D-4) | | | | | | | | | | | | | | | |
| (D-5) | | 8 | | 8 | 8 | | | | | | | | | | |
| (D-6) | | | | | | | | | | | | | | | |
| (D-7) | | | | | | | | | | | | | | | |
| (D-8) | | | | | | | | | | | | | | | |
| (D-9) | | | | | | | | | | | | | | | |
| (E-1) | 5 | 5 | 5 | 5 | 5 | 5 | 5 | 5 | 5 | 5 | 5 | 5 | 5 | 5 | 5 |
| (F-1) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| (G-1) | 0.2 | 0.2 | 0.2 | 0.2 | 0.2 | 0.2 | 0.2 | 0.2 | 0.2 | 0.2 | 0.2 | 0.2 | | | |
| (G-2) | | | | | | | | | | | | | | 0.2 | |
| (G-3) | | | | | | | | | | | | | | | 0.2 |
| (H-1) | 75 | 75 | 75 | 75 | 75 | 75 | 75 | 75 | 75 | 75 | 75 | 75 | 75 | 75 | 75 |

[Chem. 49]
(A-1)
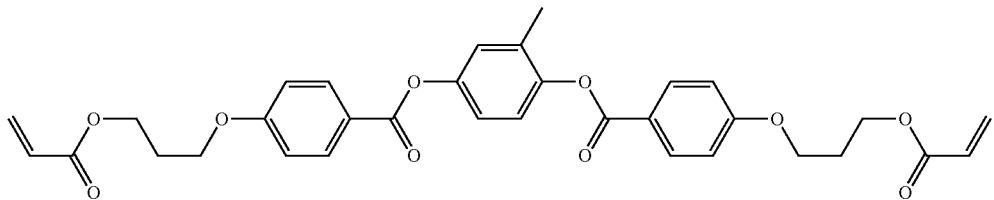
(A-2)
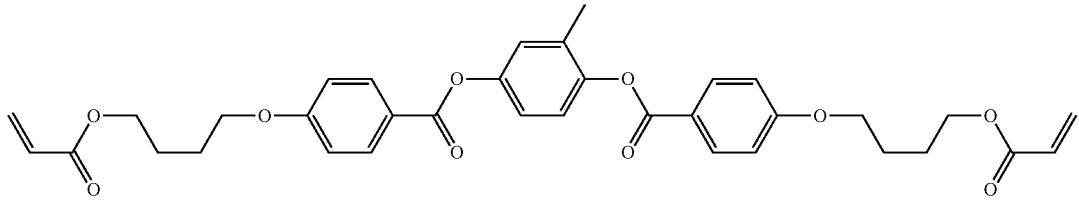
(A-3)
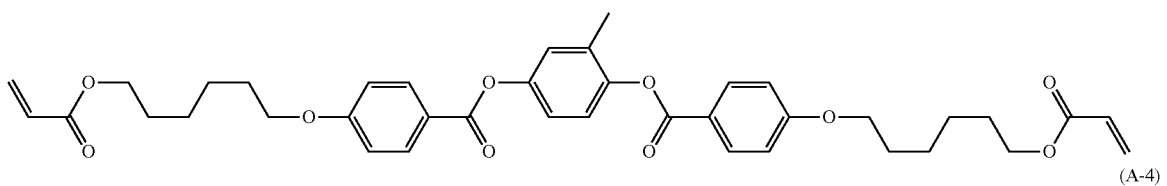
(A-4)
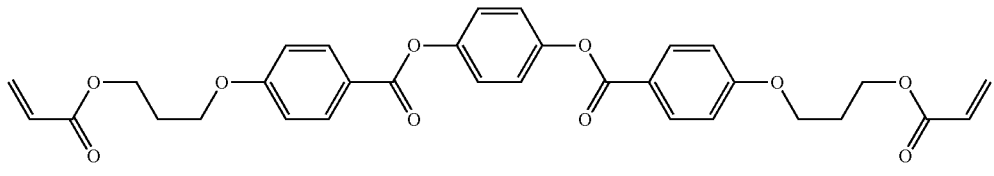
(A-5)
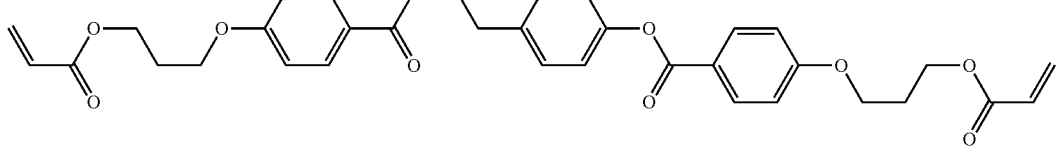
(A-6)
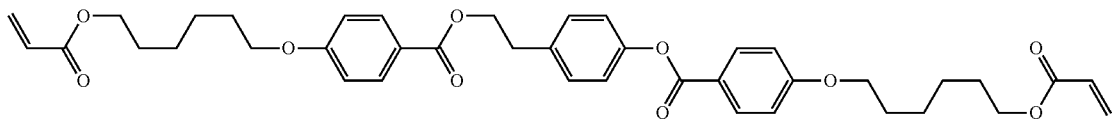
[Chem. 50]
(B-1)
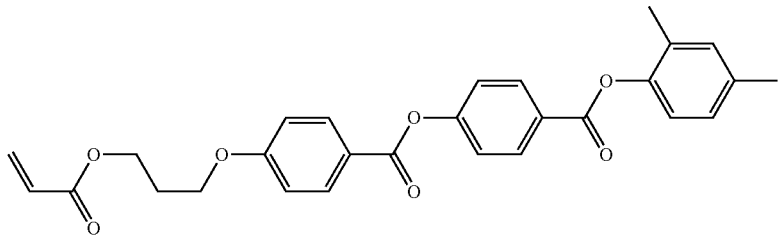
(B-2)
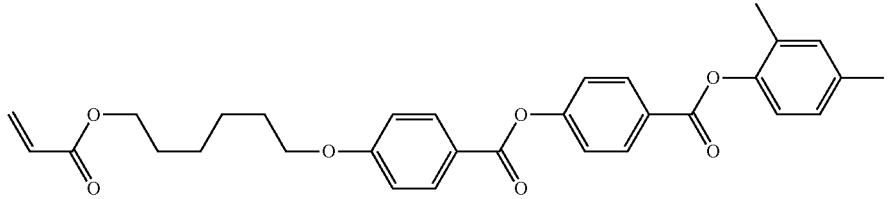

(B-3)
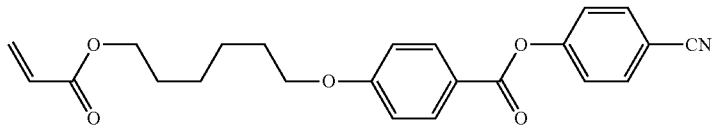
(B-4)
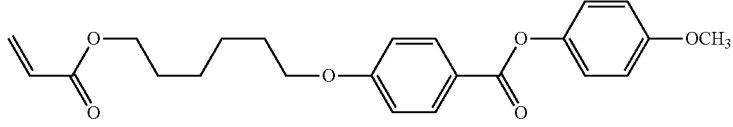
(B-5)
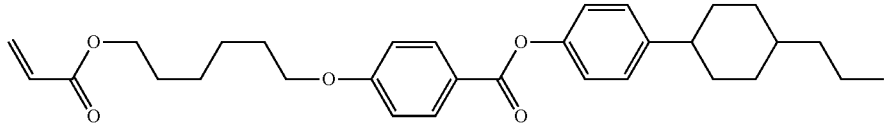
(B-6)
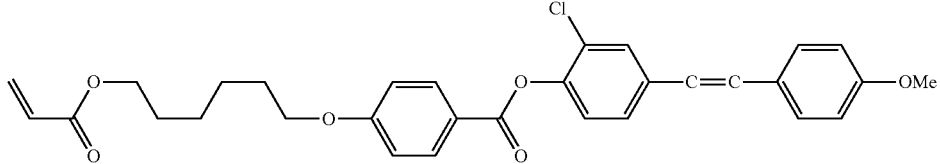
[Chem. 51]
(C-1)
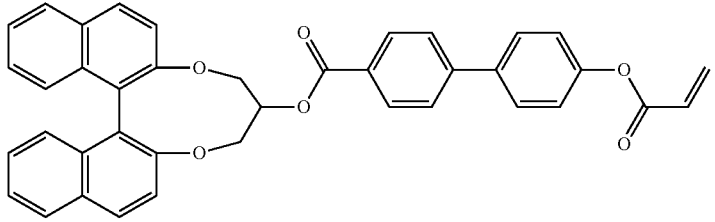
[Chem. 52]
(D-1)
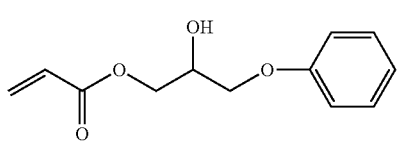
(D-2)
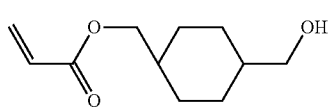
(D-3)
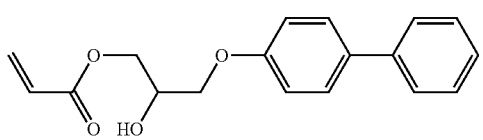
(D-4)
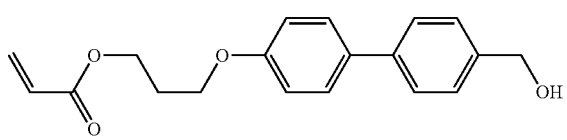
(D-5)
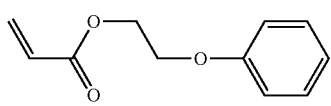
(D-6)
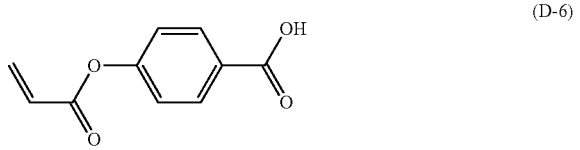
(D-7)
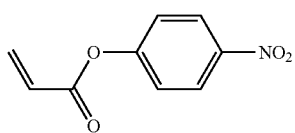
(D-8)
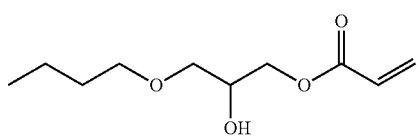

-continued

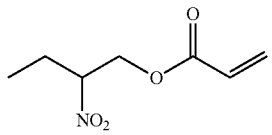

(D-9)

Irgacure 907 (E-1)

MEHQ (F-1)

Liquid Paraffin (G-1)

Surfactant BYK-333 (manufactured by BYK-Chemie GmbH) (G-2)

Surfactant FTX-218 (manufactured by NEOS COMPANY LIMITED) (G-3)

Toluene (H-1)

Example 1

(Orientation)

The polymerizable liquid crystal composition (1) was applied onto a substrate of a TAC (triacetylcellulose) film at room temperature with a #4 bar coater and then dried at 80° C. for 2 minutes. Then, the resulting product was left to stand at room temperature for 15 minutes and irradiated with UV rays with a conveyor-type high-pressure mercury lamp at the integral of light of 500 mJ/cm$^2$.

Excellent: Problem was not found through visual observation and observation with polarizing microscope Good: Problem was not found through visual observation, but non-orientation was found in some parts through observation with polarizing microscope Bad: Problem was not found through visual observation, but non-orientation was entirely found through observation with polarizing microscope Poor: Problem was found in some parts through visual observation, and non-orientation was entirely found through observation with polarizing microscope (Measurement of Haze)

The thin film produced in the test of orientation was subjected to three-point test with a haze meter NDH2000 manufactured by NIPPON DENSHOKU INDUSTRIES CO., LTD., and the average of the results obtained at the three points was evaluated.

(Adhesion)

The thin film produced in the test of orientation was cut in accordance with the cross-cut test of JIS K5400 at intervals of 1 mm with a cutter knife and a cross-cutter guide having 100 1-mm squares of 10 squares by 10 squares in both longitudinal and lateral directions. The cut thin film was attached to a cellophane adhesive tape (Cellotape (registered trademark) manufactured by Nichiban Co., Ltd.). One minute after the attachment of the cellophane adhesive tape, the cellophane adhesive tape was removed in a state in which an end of the cellophane adhesive tape was held and kept vertical to the thin film. Then, the number of squares that had not been removed and remained on the substrate was measured. This measurement was performed five times, and the average of the numbers of remaining squares was evaluated.

Table 4 shows results thereof.

TABLE 4

|  | Solution | Orientation | Haze | Adhesion |
|---|---|---|---|---|
| Example 1 | Solution (1) | Excellent | 0.16 | 100 |
| Example 2 | Solution (2) | Excellent | 0.11 | 100 |
| Example 3 | Solution (3) | Good | 0.14 | 100 |
| Example 4 | Solution (4) | Bad | 0.31 | 100 |
| Example 5 | Solution (5) | Excellent | 0.20 | 100 |
| Example 6 | Solution (6) | Excellent | 0.18 | 100 |
| Example 7 | Solution (7) | Excellent | 0.35 | 95 |
| Example 8 | Solution (8) | Excellent | 0.40 | 94 |
| Example 9 | Solution (9) | Excellent | 0.13 | 100 |
| Example 10 | Solution (10) | Excellent | 0.49 | 95 |
| Example 11 | Solution (11) | Good | 0.29 | 100 |
| Example 12 | Solution (12) | Excellent | 0.60 | 100 |
| Example 13 | Solution (13) | Excellent | 0.75 | 100 |

TABLE 5

|  | Solution | Orientation | Haze | Adhesion |
|---|---|---|---|---|
| Example 14 | Solution (14) | Good | 0.25 | 45 |
| Example 15 | Solution (15) | Good | 0.31 | 42 |
| Example 16 | Solution (16) | Good | 0.95 | 61 |
| Example 17 | Solution (17) | Good | 1.11 | 55 |
| Example 18 | Solution (18) | Good | 1.21 | 98 |
| Example 19 | Solution (19) | Good | 1.41 | 100 |
| Example 20 | Solution (20) | Good | 1.71 | 100 |
| Example 21 | Solution (21) | Good | 0.41 | 100 |
| Example 22 | Solution (22) | Bad | 0.51 | 97 |
| Example 23 | Solution (23) | Bad | 0.55 | 99 |
| Example 24 | Solution (24) | Bad | 0.42 | 50 |

TABLE 6

|  | Solution | Orientation | Haze | Adhesion |
|---|---|---|---|---|
| Comparative Example 1 | Solution (25) | Good | 2.02 | 40 |
| Comparative Example 2 | Solution (26) | Good | 2.35 | 88 |
| Comparative Example 3 | Solution (27) | Bad | 3.11 | 35 |
| Comparative Example 4 | Solution (28) | Bad | 3.29 | 85 |
| Comparative Example 5 | Solution (29) | Bad | 3.95 | 79 |
| Comparative Example 6 | Solution (30) | Bad | 4.01 | 40 |
| Comparative Example 7 | Solution (31) | Bad | 3.55 | 36 |

TABLE 7

|  | Solution | Orientation | Haze | Adhesion |
|---|---|---|---|---|
| Example 25 | Solution (32) | Excellent | 0.15 | 100 |
| Example 26 | Solution (33) | Excellent | 0.11 | 100 |
| Example 27 | Solution (34) | Excellent | 0.12 | 100 |
| Example 28 | Solution (35) | Excellent | 0.15 | 100 |
| Example 29 | Solution (36) | Excellent | 0.16 | 100 |
| Example 30 | Solution (37) | Bad | 0.65 | 100 |
| Example 31 | Solution (38) | Excellent | 0.15 | 100 |
| Example 32 | Solution (39) | Excellent | 0.11 | 100 |

Examples 2 to 32 and Comparative Examples 1 to 7

As in Example 1, the polymerizable liquid crystal compositions (2) to (39) were used to produce thin films, and the thin films were subjected to the tests of orientation, adhesion, and haze. Tables 4 to 7 show results of the tests in the name of Examples 2 to 32 and Comparative Examples 1 to 7.

The polymerizable liquid crystal compositions (Examples 1 to 24 and 25 to 32) containing the polymerizable haze-reducing agents represented by Formulae (D-1) to (D-4) and (D-6) to (D-9) enabled production of optically anisotropic bodies having better adhesion, further reduced haze, and better transparency and orientation than optically anisotropic bodies made of the polymerizable liquid crystal compositions not containing a polymerizable haze-reducing agent (Comparative Examples 1, 3, 6, and 7). In the polymerizable liquid crystal composition in which at least one monofunctional polymerizable liquid crystal compound containing three or more ring structures and at least one difunctional polymerizable liquid crystal compound containing three or more ring structures and/or polyfunctional polymerizable liquid crystal compound containing three or more ring structures were used as polymerizable liquid crystal compounds in combination in amounts greater than or equal to a certain level, just using a polymerizable haze-reducing agent containing at least one polymerizable functional group and at least one polar group without at least one divalent alicyclic hydrocarbon group or aromatic hydrocarbon group enabled production of an optically anisotropic body having a reduced haze and good transparency; however, using a polymerizable haze-reducing agent further containing at least one divalent alicyclic hydrocarbon group or aromatic hydrocarbon group enabled production of an optically anisotropic body having a further enhanced adhesion. The polymerizable liquid crystal composition that contained the compound represented by Formula (D-5) and containing no polar group resulted in an optically anisotropic body having a great haze, bad transparency, and reduced orientation.

The invention claimed is:

1. A polymerizable liquid crystal composition comprising at least one polymerizable haze-reducing agent and a polymerizable liquid crystal compound, wherein the polymerizable haze-reducing agent is a compound containing at least one polymerizable functional group and at least one group selected from —OH, —NH$_2$, —NO$_2$, and —SH.

2. The polymerizable liquid crystal composition according to claim 1, wherein the polymerizable haze-reducing agent is a compound (I) containing at least one divalent alicyclic hydrocarbon group or aromatic hydrocarbon group.

3. The polymerizable liquid crystal composition according to claim 2, wherein the compound (I) is at least one compound selected from the group consisting of compounds represented by General Formula (I-1)

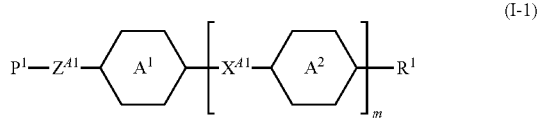

(where P$^1$ represents a polymerizable functional group; Z$^{A1}$ represents an alkylene group having 1 to 16 carbon atoms, and the alkylene group may be linear or branched; one or more CH$_2$ groups in the alkylene group are each independently optionally substituted with —O—, —S—, —NH—, —N(CH$_3$)—, —CO—, —COO—, —OCOO—, —SCO—, —COS—, —CH=CH—, or —C≡C— such that oxygen atoms, sulfur atoms, and an oxygen atom and sulfur atom are not directly bonded to each other; at least one hydrogen atom in the alkylene group is optionally substituted with a group selected from —OH, NH$_2$, —NO$_2$, and —SH;

rings A$^1$ and A$^2$ each independently represent a 1,4-phenylene group or a 1,4-cyclohexylene group and are optionally unsubstituted or substituted with at least one substituent L; in the case where A$^2$ is multiple, they may be the same as or different from each other;

the substituent L is a fluorine atom, a chlorine atom, a bromine atom, an iodine atom, a pentafluoro sulphuranyl group, a cyano group, an amino group, a hydroxyl group, a mercapto group, a methylamino group, a dimethylamino group, a diethylamino group, a diisopropylamino group, a trimethylsilyl group, or a dimethylsilyl group; X$^{A1}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —CH=N—N=CH—, —CF=CF—, —C≡C—, or a single bond; in the case where X$^{A1}$ is multiple, they may be the same as or different from each other;

m represents 0, 1, or 2;

R$^1$ represents a hydrogen atom, an OH group, an NH$_2$ group, an NO$_2$ group, an SH group, or linear or branched alkyl group having 1 to 20 carbon atoms; at least one hydrogen atom in the alkyl group is optionally substituted with a group selected from —OH, —NH$_2$, —NO$_2$, or —SH;

one or more CH$_2$ groups in the alkyl group are each independently optionally substituted with —O—, —S—, —NH—, —N(CH$_3$)—, —CO—, —COO—, —OCO—, —OCOO—, —SCO—, —COS—, —CH=CH—, or —C≡C— such that oxygen atoms, sulfur atoms, and an oxygen atom and sulfur atom are not directly bonded to each other; and Z$^{A1}$ and/or R$^1$ are at least one group selected from —OH, —NH$_2$, —NO$_2$, and —SH or have a group selected from —OH, —NH$_2$, —NO$_2$, and —SH).

4. The polymerizable liquid crystal composition according to claim 3, wherein m in General Formula (I-1) is 0.

5. The polymerizable liquid crystal composition according to claim 3, wherein at least one compound represented by General Formula (I-2) is used as the compound represented by General Formula (I-1)

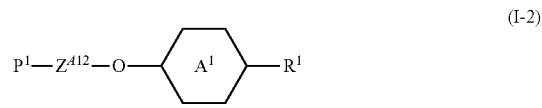

(where $P^1$, $A^1$, and $R^1$ have the same definitions as those in claim 4; $Z^{A12}$ represents an alkylene group that has 1 to 15 carbon atoms and that may be linear or branched; one $CH_2$ group or two or more $CH_2$ groups not adjoining each other in the alkylene group are each independently optionally substituted with —O—, —S—, —NH—, —N(CH$_3$)—, —CO—, —COO—, —OCO—, —OCOO—, —SCO—, —COS—, —CH=CH—, or —C≡C— such that oxygen atoms, sulfur atoms, and an oxygen atom and sulfur atom are not directly bonded to each other; and one or more hydrogen atoms in the alkylene group are each independently substituted with a group selected from —OH, —NH$_2$, —NO$_2$, and —SH).

6. The polymerizable liquid crystal composition according to claim 3, wherein at least one compound represented by General Formula (I-3) is used as the compound represented by General Formula (I-1)

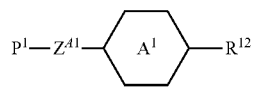

(I-3)

(where $P^1$, $Z^{A1}$, and $A^1$ have the same definitions as those in claim 4; $R^{12}$ is an OH group, an NH$_2$ group, an NO$_2$ group, an SH group, or a linear or branched alkyl group having 1 to 10 carbon atoms; the alkyl group has a group selected from —OH, —NH$_2$, —NO$_2$, and —SH; in the alkyl group, one $CH_2$ group or two or more $CH_2$ groups not adjoining each other are each independently optionally substituted with —O—, —S—, —NH—, —N(CH$_3$)—, —CO—, —COO—, —OCO—, —OCOO—, —SCO—, —COS—, —CH=CH—, or —C≡C— such that oxygen atoms, sulfur atoms, and an oxygen atom and sulfur atom are not directly bonded to each other).

7. The polymerizable liquid crystal composition according to claim 1, wherein the polymerizable liquid crystal compound is a compound represented by General Formula (II))

(II)

(where $P^2$ represents a polymerizable functional group; $S^1$ represents an alkylene group having 1 to 18 carbon atoms (in the alkylene group, a hydrogen atom is optionally substituted with at least one halogen atom or CN group; and one $CH_2$ group or two or more $CH_2$ groups not adjoining each other are each independently optionally substituted with —O—, —COO—, —OCO—, or —OCO—O—); $X^1$ represents —O—, —S—, —OCH$_2$—, —CH$_2$O—, —CO—, —OCO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond (where $P^2$—$S^1$ and $S^1$—$X^1$ exclude —O—O—, —O—NH—, —S—S—, and —O—S—); $q^1$ represents 0 or 1; MG represents a mesogenic group;

$R^2$ represents a hydrogen atom, a halogen atom, a cyano group, or a linear or branched alkyl group having 1 to 12 carbon atoms; the alkyl group may be linear or branched; in the alkyl group, one —CH$_2$— or two or more —CH$_2$—'s not adjoining each other are each independently optionally substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, 13 CH=CH—, —CF=CF—, or —C≡C—; and $R^2$ alternatively represents a group represented by General Formula (II-a)

(II-a)

(where $P^3$ represents a polymerizable functional group; $S^2$ has the same definition as $S^1$; $X^2$ has the same definition as $X^1$ (where $P^3$—$S^2$ and $S^2$—$X^2$ exclude —O—O—, —O—NH—, —S—S—, and —O—S—); and $q^2$ represents 0 or 1).

8. The polymerizable liquid crystal composition according to claim 7, wherein the compound represented by General Formula (II) is a compound in which MG is represented by General Formula (II-b)

(II-b)

(where B 1, B 2, and B 3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b :4, 5 -b ']dithiophene-2,6-diyl group, a benzo[1,2-b :4,5 -b'] diselenophene-2,6-diyl group, a [1]benzothieno[3,2-b] thiophene-2,7-diyl group, a [1]benzoselenopheno[3,2-b]selenophene-2,7-diyl group, or a fluorene-2,7-diyl group and optionally has, as a substituent, at least one selected from F, Cl, CF$_3$, OCF$_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, an alkenoyloxy group having 2 to 8 carbon atoms, and/or General Formula (II-c)

(II-c)

(where $P^4$ represents a polymerizable functional group; $S^3$ represents an alkylene group having 1 to 18 carbon atoms; $X^3$ represents —O—, —COO—, —OCO—, —OCH$_2$—, —CH$_2$O—, —CH$_2$CH$_2$OCO—, or —CH$_2$CH$_2$COO—; $q^3$ represents 0 or 1; $q^4$ represents 0 or 1

(where $P^4$—$S^3$ and $S^3$—$X^3$ exclude —O—O—, —O—NH—, —S—S—, and —O—S—));

Z1 and Z2 each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond;

r1 represents 0, 1, or 2; and in the case where B 1 and Z1 are multiple, corresponding ones of them may be the same as or different from each other).

9. The polymerizable liquid crystal composition according to claim 8, wherein the compound represented by General Formula (II) is at least one compound selected from the group consisting of compounds represented by General Formula (II-2-2-2)

$$P^2\text{-}(S^1\text{-}X^1)_{q1}\text{-}B\,11\text{-}Z\,11\text{-}B2\text{-}Z\,2\text{-}B\,3\text{-}(X^2\text{-}S^2)_{q2}\text{-}P^3 \quad \text{(II-2-2-2)}$$

(where P$^2$ and P$^3$ each independently represent a polymerizable functional group; S$^1$ and S$^2$ each independently represent an alkylene group having 1 to 18 carbon atoms (in the alkylene group, a hydrogen atom is optionally substituted with at least one halogen atom, CN group, or alkyl group having 1 to 8 carbon atoms and a polymerizable functional group; and one CH$_2$ group or two or more CH$_2$ groups not adjoining each other are each independently optionally substituted with —O—, —COO—, —OCO—, or —OCO—O—); X$^1$ and X$^2$ each independently represent —O—, —S—, —OCH$_2$—, —CH$_2$O—, —CO—, —COO—, —OCO—, —CO—S—, —S—CO—, —O—CO—O—, —CO—NH—NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond (where P$^2$—S$^1$ and S$^1$—X$^1$ exclude —O—O—, —O—NH—, —S—S—, and —O—S—); q1 and q2 each independently represent 0 or 1;

B11, B2, and B3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and optionally has, as a substituent, at least one selected from F, Cl, CF$_3$, OCF$_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkoxycarbonyl group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms; and Z11 and Z2 each independent represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —C=N—, —N=C—, —CONH—, —NHCO—, —C(CF$_3$)$_2$—, an alkyl group having 2 to 10 carbon atoms and optionally a halogen atom, or a single bond).

10. A polymer produced through polymerization of the polymerizable liquid crystal composition according to claim 1.

11. An optically anisotropic body produced by using the polymerizable liquid crystal composition according to claim 1.

12. A retardation film produced by using the polymerizable liquid crystal composition according to claim 1.

13. A patterned retardation film produced by using the polymerizable liquid crystal composition according to claim 1.

14. A brightness-enhancing film produced by using the polymerizable liquid crystal composition according to claim 1.

* * * * *